US012384174B2

(12) United States Patent
Nakata et al.

(10) Patent No.: US 12,384,174 B2
(45) Date of Patent: Aug. 12, 2025

(54) PRINTING APPARATUS AND CONTROLLING METHOD

(71) Applicant: SEIKO EPSON CORPORATION, Tokyo (JP)

(72) Inventors: Satoshi Nakata, Matsumoto (JP); Daisuke Kanuma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 91 days.

(21) Appl. No.: 18/507,723

(22) Filed: Nov. 13, 2023

(65) Prior Publication Data

US 2024/0157715 A1 May 16, 2024

(30) Foreign Application Priority Data

Nov. 15, 2022 (JP) ................................ 2022-182275

(51) Int. Cl.
*B41J 13/10* (2006.01)
*B41J 11/42* (2006.01)
*B65H 31/02* (2006.01)

(52) U.S. Cl.
CPC ............ *B41J 11/42* (2013.01); *B41J 13/106* (2013.01); *B65H 31/02* (2013.01); *B65H 2405/35* (2013.01); *B65H 2801/06* (2013.01)

(58) Field of Classification Search
CPC ............... B65H 2405/35; B65H 31/02; B65H 2801/06; B41J 11/42; B41J 13/106
See application file for complete search history.

(56) References Cited

U.S. PATENT DOCUMENTS 9,278,553 B2 * 3/2016 Nakano .................... B41J 11/02
2010/0194036 A1 * 8/2010 Tsuchihashi ....... B65H 31/3063 271/279
2019/0003222 A1 * 1/2019 Taguchi ............. G03G 21/1633

FOREIGN PATENT DOCUMENTS

JP 2017-149088 A 8/2017

* cited by examiner

*Primary Examiner* — Jennifer Bahls
(74) *Attorney, Agent, or Firm* — WORKMAN NYDEGGER

(57) ABSTRACT

A printing apparatus includes: a printing unit; an operation unit configured to be able to rotate about a rotation axis to a first operation position and a second operation position; a paper discharge tray configured to be able to move in a front-rear direction; a movement unit configured to move the paper discharge tray; a rotating mechanism configured to cause the operation unit from the first operation position to the second operation position in association with movement of the paper discharge tray; and a control unit, in which the paper discharge tray is able to move to an accommodating position, a loading position, and a stand-by position, when a position of the operation unit is the first operation position and the paper discharge tray moves between the accommodating position and the stand-by position, the rotating mechanism causes the operation unit to rotate from the first operation position to the second operation position, and when a position of the paper discharge tray is the accommodating position and the first condition is satisfied, the control unit performs first control in which the paper discharge tray is moved to the stand-by position.

In the printing apparatus, the paper discharge tray, which is able to move in the front-rear direction, is able to move to the accommodating position, the loading position, and the stand-by position. When the position of the operation unit is the first operation position and the paper discharge tray moves between the accommodating position and the stand-by position, the rotating mechanism, which causes the operation unit to rotate from the first operation position to the second operation position in association with movement of the paper discharge tray, causes the operation unit to rotate from the first operation position to the second operation position. When the position of the paper discharge tray is the accommodating position and the first condition is satisfied, the control unit causes the paper discharge tray to move to the stand-by position.

20 Claims, 17 Drawing Sheets

PRINTING APPARATUS AND CONTROLLING METHOD

The present application is based on, and claims priority from JP Application Serial Number 2022-182275, filed on Nov. 15, 2022, the disclosure of which is hereby incorporated by reference herein in its entirety.

BACKGROUND

1. Technical Field

This disclosure relates to a printing apparatus and a controlling method.

2. Related Art

Study and development have been made as to a printing apparatus configured to print an image on a printing medium.

In this regard, there is known a printing apparatus (see JP-A-2017-149088). This printing apparatus includes: an operation unit configured to receive an operation and be able to rotate about a predetermined rotation axis to a first operation position at which the operation unit is inclined at a predetermined first angle relative to an installation surface where the printing apparatus is disposed, and also to a second operation position at which the operation unit is inclined at a second angle smaller than the first angle relative to the installation surface; a paper discharge tray configured to receive a discharged printing medium; a movement unit configured to move the paper discharge tray back and forth; and a rotating unit such as a motor configured to cause the operation unit to rotate from the first operation position to the second operation position in association with movement of the paper discharge tray by the movement unit.

Here, the printing apparatus described in JP-A-2017-149088 uses driving force of the paper feeding motor to move the paper discharge tray when printing is performed. Thus, this printing apparatus moves the position of the operation unit from the first operation position to the second operation position to turn the state of the printing apparatus into a state in which a user can easily perform operation. However, the timing at which a user wishes to turn the stage of the printing apparatus into an easily operable state is not only when printing is performed. Thus, in a case of this printing apparatus, there is a possibility that, at timing when a user desires, the printing apparatus cannot be turned into the state in which the user can easily operate.

SUMMARY

An aspect of the present disclosure used to solve the problem described above provides a printing apparatus including a printing unit configured to print an image on a printing medium, an operation unit configured to receive an operation and rotate about a rotation axis to a first operation position and a second operation position, the first operation position being a position at which the operation unit is inclined at a predetermined first angle relative to an installation surface where the printing apparatus is disposed, the second operation position being a position at which the operation unit is inclined at a second angle smaller than the first angle relative to the installation surface, a paper discharge tray provided lower than the rotation axis in a height direction, the height direction being a direction perpendicular to the installation surface and directed from the installation surface toward the printing apparatus, the paper discharge tray being configured to move in a front-rear direction toward a first direction intersecting the height direction, a movement unit configured to move the paper discharge tray, a rotating mechanism configured to cause the operation unit to rotate from the first operation position to the second operation position in association with movement of the paper discharge tray, and a control unit configured to control the printing unit, the operation unit, and the movement unit, in which the paper discharge tray is configured to move to an accommodating position, a loading position, and a predetermined stand-by position, the accommodating position being a position at which the paper discharge tray is accommodated in a housing of the printing apparatus, the loading position being a position at which the paper discharge tray receives the discharged printing medium, the predetermined stand-by position being a position disposed closer to the accommodating position than the loading position, when a position of the operation unit is the first operation position and the paper discharge tray moves between the accommodating position and the stand-by position, the rotating mechanism causes the operation unit to rotate from the first operation position to the second operation position, and when a position of the paper discharge tray is the accommodating position and a predetermined first condition is satisfied, the control unit controls the movement unit to perform first control in which the paper discharge tray is moved to the stand-by position.

In addition, an aspect of the present disclosure provides a printing apparatus including a printing unit configured to print an image on a printing medium, an operation unit configured to receive an operation and rotate about a rotation axis to a first operation position and a second operation position, the first operation position being a position at which the operation unit is inclined at a predetermined first angle relative to an installation surface where the printing apparatus is disposed, the second operation position being a position at which the operation unit is inclined at a second angle smaller than the first angle relative to the installation surface, a paper discharge tray provided lower than the rotation axis in a height direction, the height direction being a direction perpendicular to the installation surface and directed from the installation surface toward the printing apparatus, the paper discharge tray being configured to move in a front-rear direction toward a first direction intersecting the height direction, a movement unit configured to move the paper discharge tray, a rotating mechanism configured to cause the operation unit to rotate from the first operation position to the second operation position in association with movement of the paper discharge tray, and a control unit configured to control the printing unit, the operation unit, and the movement unit, in which the paper discharge tray is configured to move to an accommodating position, and a loading position, the accommodating position being a position at which the paper discharge tray is accommodated in a housing of the printing apparatus, the loading position being a position at which the paper discharge tray receives the discharged printing medium, when a position of the operation unit is the first operation position and the paper discharge tray moves between the accommodating position and the loading position, the rotating mechanism causes the operation unit to rotate from the first operation position to the second operation position, and when a position of the paper discharge tray is the accommodating position and a predetermined first condition is satisfied, the control unit controls the movement unit to perform third control in which the paper discharge tray is moved to the loading position and then, the paper discharge tray is moved to the accommodating position.

Furthermore, an aspect of the present disclosure provides a method of controlling a printing apparatus, the printing apparatus including a printing unit configured to print an image on a printing medium, an operation unit configured to receive an operation and rotate about a rotation axis to a first operation position and a second operation position, the first operation position being a position at which the operation unit is inclined at a predetermined first angle relative to an installation surface where the printing apparatus is disposed, the second operation position being a position at which the operation unit is inclined at a second angle smaller than the first angle relative to the installation surface, a paper discharge tray provided lower than the rotation axis in a height direction, the height direction being a direction perpendicular to the installation surface and directed from the installation surface toward the printing apparatus, the paper discharge tray being configured to move in a front-rear direction toward a first direction intersecting the height direction, a movement unit configured to move the paper discharge tray, and a rotating mechanism configured to cause the operation unit to rotate from the first operation position to the second operation position in association with movement of the paper discharge tray, in which the paper discharge tray is configured to move to an accommodating position, a loading position, and a predetermined stand-by position, the accommodating position being a position at which the paper discharge tray is accommodated in a housing of the printing apparatus, the loading position being a position at which the paper discharge tray receives the discharged printing medium, the predetermined stand-by position being a position disposed closer to the accommodating position than the loading position, when a position of the operation unit is the first operation position and the paper discharge tray moves between the accommodating position and the stand-by position, the rotating mechanism causes the operation unit to rotate from the first operation position to the second operation position, and when a position of the paper discharge tray is the accommodating position and a predetermined first condition is satisfied, the method of controlling includes controlling the movement unit to perform a first control step in which the paper discharge tray is moved to the stand-by position.

DESCRIPTION OF EMBODIMENTS

Embodiment

Figure 1:
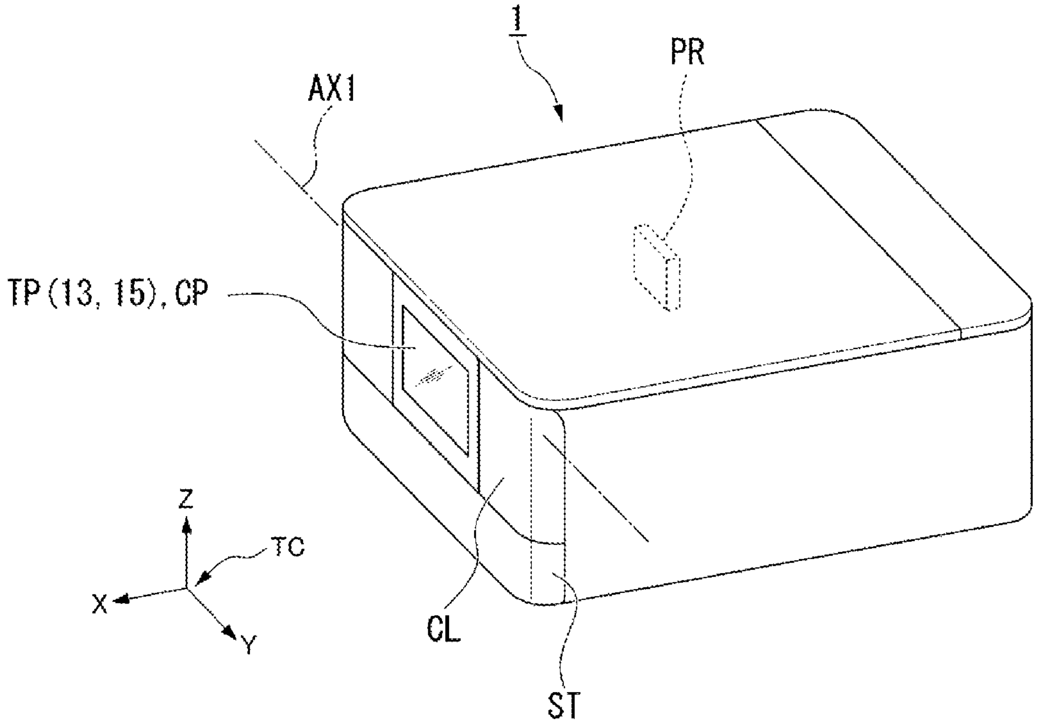
FIG. 1 is a diagram illustrating one example of the external appearance of a printing apparatus 1.

Below, embodiment of the present disclosure will be described with reference to the drawings.

Overview of Printing Apparatus

First, an overview of a printing apparatus according to the embodiment will be described.

The printing apparatus according to the embodiment includes a printing unit, an operation unit, a paper discharge tray, a movement unit, a rotating mechanism, and a control unit. The printing unit is configured to print an image on a printing medium. The operation unit is configured to be able to rotate about a rotation axis to a first operation position and a second operation position, and also receives an operation. Of positions that the operation unit can take, the first operation position is a position at which the operation unit is inclined at a predetermined first angle relative to an installation surface where the printing apparatus is disposed.

Of positions that the operation unit can take, the second operation position is a position at which the operation unit is inclined at a second angle smaller than the first angle relative to the installation surface. The paper discharge tray is provided lower than the rotation axis in a height direction. Of directions perpendicular to the installation surface, the height direction is a direction directed from the installation surface toward the printing apparatus. In addition, the paper discharge tray is a tray configured to be able to move in a front-rear direction toward a first direction intersecting the height direction. The movement unit is configured to move the paper discharge tray. The rotating mechanism is a mechanism that causes the operation unit to rotate from the first operation position to the second operation position in association with movement of the paper discharge tray. The control unit is configured to control the printing unit, the operation unit, and the movement unit. Here, the paper discharge tray is configured to be able to move to an accommodating position, a loading position, and a predetermined stand-by position. At the accommodating position, the paper discharge tray is accommodated in a housing of the printing apparatus. At the loading position, the printing medium that has been discharged is received. The predetermined stand-by position is disposed closer to the accommodating position than the loading position. Furthermore, when the position of the operation unit is the first operation position and the paper discharge tray moves between the accommodating position and the stand-by position, the rotating mechanism causes the operation unit to rotate from the first operation position to the second operation position. In addition, when the position of the paper discharge tray is the accommodating position and a predetermined first condition is satisfied, the control unit controls the movement unit to perform first control in which the paper discharge tray is moved to the stand-by position. This configuration enables the printing apparatus to turn the state of the printing apparatus into a state in which a user can easily operate at timing that the user desires.

Below, detailed description will be made of the configuration of the printing apparatus according to the embodiment and processes performed by this printing apparatus.

Configuration of Printing Apparatus

Below, the configuration of the printing apparatus according to the embodiment will be described by using the printing apparatus 1 as an example.

FIG. 1 is a diagram illustrating one example of the external appearance of the printing apparatus 1.

Here, the three-dimensional coordinate system TC is a three-dimensional Cartesian coordinate system indicating directions in the drawings in which this three-dimensional coordinate system TC is provided. In the following description, the X-axis in the three-dimensional coordinate system TC is simply referred as an X-axis, for the purpose of convenience of explanation. Furthermore, in the following description, the Y-axis in the three-dimensional coordinate system TC is simply referred as a Y-axis, for the purpose of convenience of explanation. In addition, in the following description, the Z-axis in the three-dimensional coordinate system TC is simply referred as a Z-axis, for the purpose of convenience of explanation. Furthermore, below, description will be made of a case in which the negative direction of the Z-axis is equal to the gravitational direction, as one example. Thus, in the following description, the positive direction of the Z-axis is referred to as an upward direction or simply as the upward, and the negative direction of the Z-axis is referred to as a downward direction or simply as the downward, for the purpose of convenience of explanation.

Furthermore, in the following description, of surfaces that the printing apparatus 1 has, a surface at a positive direction side of the X-axis is referred to as a front face of the printing apparatus 1, for the purpose of convenience of explanation. In addition, of surfaces that the printing apparatus 1 has, a surface at a negative direction side of the X-axis is referred to as a rear face of the printing apparatus 1. Furthermore, in the following description, of surfaces that the printing apparatus 1 has, a surface at a positive direction side of the Y-axis is referred to as a right face of the printing apparatus 1, for the purpose of convenience of explanation. In addition, of surfaces that the printing apparatus 1 has, a surface at a negative direction side of the Y-axis is referred to as a left face of the printing apparatus 1. Furthermore, in the following description, of surfaces that the printing apparatus 1 has, a surface at a positive direction side of the Z-axis is referred to as an upper surface of the printing apparatus 1, for the purpose of convenience of explanation. In addition, of surfaces that the printing apparatus 1 has, a surface at a negative direction side of the Z-axis is referred to as a lower surface of the printing apparatus 1.

The printing apparatus 1 prints an image on the printing medium. The printing apparatus 1 is, for example, an ink jet-type printer. In this case, the printing apparatus 1 includes, inside thereof, a printing unit PR configured to print an image on a printing medium. The printing unit PR includes: a paper feeding motor, which is not illustrated in FIG. 1; a plurality of paper feeding rollers driven by the paper feeding motor; a printing head configured to discharge a liquid such as ink onto the printing medium; a carriage configured to move the printing head in a scanning direction; and the like. Note that FIG. 1 illustrates the printing unit PR as a cuboid-shaped object in order to avoid complicating the drawing. In addition, instead of the ink jet-type printer, the printing apparatus 1 may be a printer of another type such as a laser printer, a multifunction device, or the like.

Here, the printing medium may be any medium, provided that the printing medium is a sheet-shaped medium such as a printing sheet, a seal mount, or the like, for example. Below, description will be made on the assumption that the printing medium is a printing sheet as one example. The printing apparatus 1 includes an accommodating unit ST configured to be able to move toward a first direction (that will be described later) in a front-rear direction, and also able to accommodate one or more such printing media. The accommodating unit ST is a paper-feed cassette, and is accommodated in the printing apparatus 1 along the first direction from the front face toward the rear face of the printing apparatus 1. In addition, in a state of being accommodated in the printing apparatus 1, the accommodating unit ST constitutes a portion of the front face of the printing apparatus 1. In the example illustrated in FIG. 1, the accommodating unit ST constitutes a lower surface of the front face of the printing apparatus 1. The one or more printing media accommodated in the accommodating unit ST are supplied one by one to the printing unit PR by a paper feed roller that is not illustrated. With this configuration, by using the printing head moved with the carriage, the printing unit PR is able to print an image on the printing medium supplied from the accommodating unit ST.

Furthermore, the printing apparatus 1 includes the operation unit CP configured to display an image on a display unit included in the printing apparatus 1, and receives an operation from a user performed while the displayed image is being viewed.

The operation unit CP includes a hardware key, a touch pad, or the like, and is a member that constitutes a portion of the front face of the printing apparatus 1. In the example illustrated in FIG. 1, of the front face of the printing apparatus 1, the operation unit CP constitutes a surface higher than the surface that the accommodating unit ST constitutes. In the following description, it is assumed that the operation unit CP includes a touch panel TP in which the display unit and a touch pad are integrally configured as illustrated in FIG. 1, as one example. Note that the operation unit CP may be configured to include a hardware key together with the touch panel TP, or may be configured such that no hardware key is provided.

Figure 2:
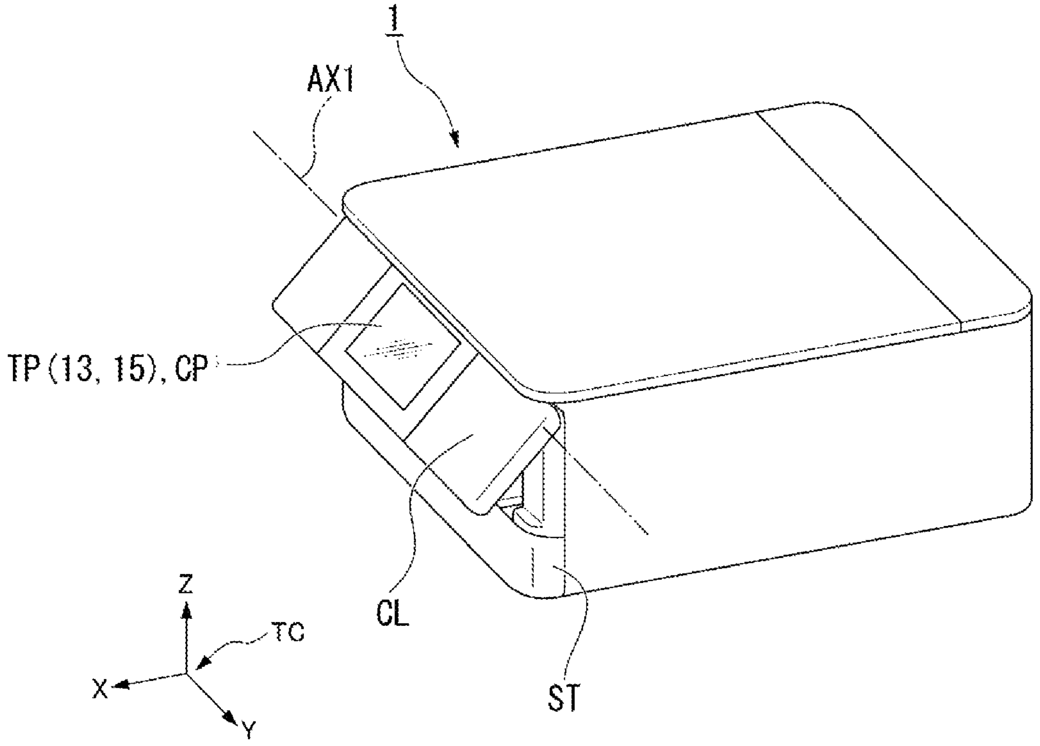
FIG. 2 is a perspective view illustrating one example of a state of an operation unit CP rotated to a position where the operation unit CP is inclined at a substantially 45° relative to an installation surface at which the printing apparatus 1 is disposed.
Figure 3:
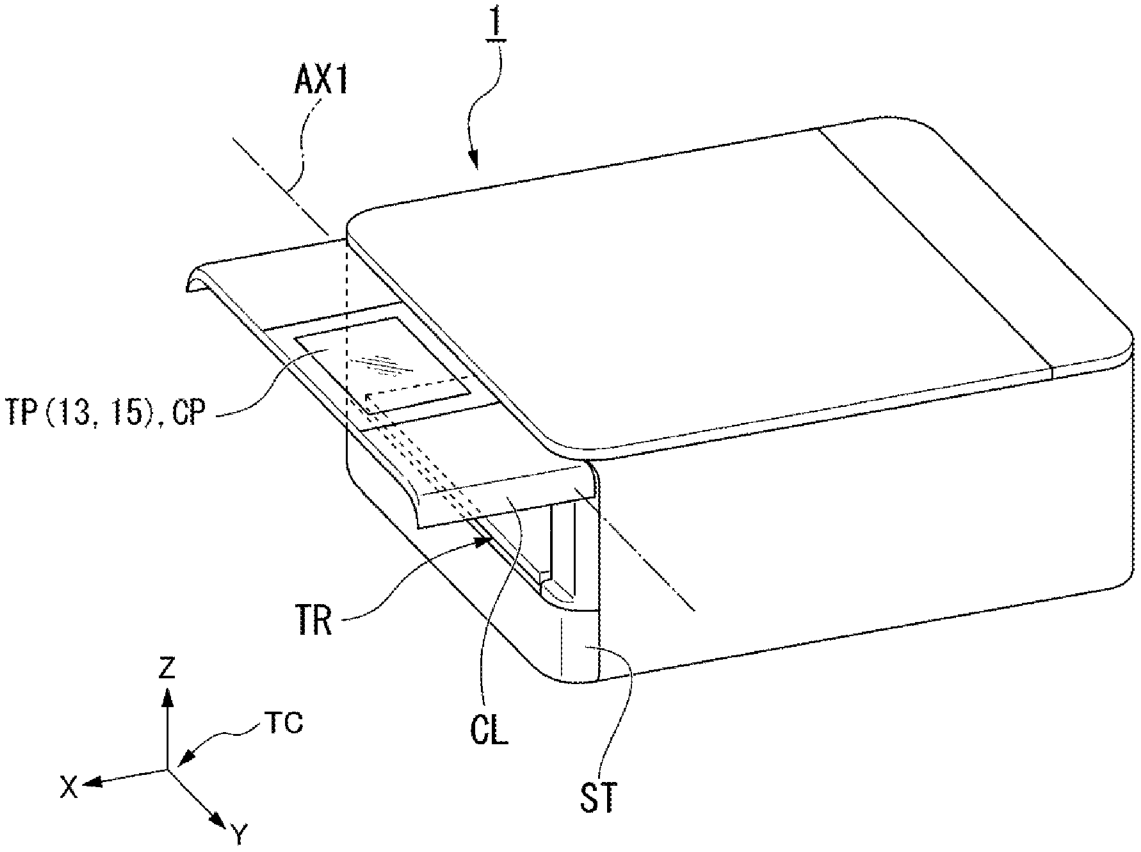
FIG. 3 is a perspective view illustrating one example of a state of the operation unit CP rotated to a position where the operation unit CP is substantially parallel to the installation surface at which the printing apparatus 1 is disposed.

In addition, the operation unit CP is able to rotate about a predetermined rotation axis AX1 relative to a housing of the printing apparatus 1. In the example illustrated in FIG. 1, the rotation axis AX1 is disposed higher than the front face side of the printing apparatus 1, and is an axis parallel to the Y-axis. The operation unit CP is configured such that, with a force being applied by a hand of a user toward an opening direction in which the operation unit CP moves away from the housing from among two directions of rotation about the rotation axis AX1, the operation unit is able to rotate to a position at which the operation unit is inclined at substantially 45° relative to the installation surface where the printing apparatus 1 is disposed, as illustrated in FIG. 2. FIG. 2 is a perspective view illustrating one example of a state of the operation unit CP rotated to a position where the operation unit is inclined at substantially 45° relative to the installation surface where the printing apparatus 1 is disposed. Note that the installation surface is, for example, a floor surface, the upper surface of a table, the upper surface of a desk, or the like. However, the installation surface is not limited to these. In addition, the operation unit CP is configured so as to be able to rotate to a position substantially parallel to the installation surface as illustrated in FIG. 3 with a force being applied, for example, by a hand of a user toward the opening direction. FIG. 3 is a perspective view illustrating one example of a state of the operation unit CP rotated to a position substantially parallel to the installation surface where the printing apparatus 1 is disposed.

In this manner, the operation unit CP is able to rotate about the rotation axis AX1, and hence, is able to rotate to the first operation position at which the operation unit is inclined at the predetermined first angle relative to the installation surface and also to the second operation position at which the operation unit is inclined at the second angle smaller than the first angle relative to the installation surface. Here, the first angle is, for example, 90°. In this case, the first operation position is a position at which the operation unit CP illustrated in FIG. 1 is disposed, and is a position at which the operation unit CP closes a portion of the front face of the printing apparatus 1. Note that, instead of 90°, the first angle may be an angle smaller than 90°, provided that the first angle is larger than the second angle. The second angle is, for example, 45°. In this case, the second operation position is a position at which the operation unit CP illustrated in FIG. 2 is disposed. When the position of the operation unit CP is the second operation position, the visibility for a user to view the touch panel TP of the operation unit CP improves. This is because the printing apparatus 1 is often disposed at a position lower than the position of an eye of a person who stands. That is, positioning the operation unit CP at the second operation position is equal to turning the state of the printing apparatus 1 into a position at which a user can easily operate. Note that, instead of 45°, the second angle may be any angle, provided that the second angle is smaller than the first angle.

In addition, with a pressurizing mechanism that is not illustrated, a force toward the opening direction is applied to the operation unit CP. The pressurizing mechanism may be a known mechanism including a biasing member such as a spring or may be a mechanism that will be developed in the future, provided that this pressurizing mechanism is a mechanism that is able to apply force to the operation unit CP in the opening direction. In addition, with a fixing mechanism that is not illustrated in the drawing, the operation unit CP is fixed at a position after the operation unit is rotated by the user. The fixing mechanism may be a known mechanism that is able to fix the operation unit CP at this position or may be a mechanism that will be developed in the future. It should be noted that the operation unit CP is fixed by the fixing mechanism with a strength at which the fixing is not canceled even if a user operates the touch panel TP while the fixing can be canceled by application of force by a hand of the user with the aim of rotating the operation unit CP.

In addition, the printing apparatus 1 includes the paper discharge tray TR, as illustrated in FIG. 3. Note that, in FIGS. 1 and 2, the paper discharge tray TR cannot be seen because it is hidden behind the operation unit CP.

The paper discharge tray TR is a tray to which a printing medium after an image has been printed by the printing unit PR is discharged. The paper discharge tray TR is provided lower than the rotation axis AX1 in a height direction that is a direction directed from the installation surface toward the printing apparatus 1 from among directions perpendicular to the installation surface. In the description below, it is assumed that the height direction is an upward-downward direction as illustrated in FIGS. 1 to 3, as one example. In the example illustrated in FIGS. 1 to 3, the paper discharge tray TR can be visually recognized from the outside of the printing apparatus 1 when the position of the operation unit CP is not the first operation position. That is, when the printing apparatus 1 is viewed from the front face of the printing apparatus 1 toward the rear face of the printing apparatus 1 and the position of the operation unit CP is the first operation position, the paper discharge tray TR overlaps with the operation unit CP. In this case, the printing apparatus 1 makes it possible to suppress an increase in the size thereof in the height direction, and it is possible to reduce the size thereof. Note that it may be possible to employ a configuration in which, when the printing apparatus 1 is viewed from the front face toward the rear face and the position of the operation unit CP is the first operation position, a portion of or all of the paper discharge tray TR does not overlap with the operation unit CP.

In addition, the paper discharge tray TR is a tray configured to be able to move in the front-rear direction toward the first direction intersecting the height direction. Here, in the following description, it is assumed that, of directions parallel to the installation surface, the first direction is a direction directed from the rear face of the printing apparatus 1 toward the front face of the printing apparatus 1, that is, the positive direction of the X-axis, as one example. Furthermore, in the following description, the direction opposite from the first direction is referred to as a second direction, for the purpose of convenience of explanation. In addition, in the following description, it is assumed that the position of the paper discharge tray TR is indicated as the position of the center of gravity of the paper discharge tray TR. Note that, instead of the position of the center of gravity, the position of the paper discharge tray TR may be expressed using another position corresponding to the paper discharge tray TR. Since the paper discharge tray TR is a tray configured to be able to move in the front-rear direction toward the first direction, the paper discharge tray TR is able to move to: the accommodating position at which the paper discharge tray TR is accommodated in the housing of the printing apparatus 1; the loading position at which the printing medium that has been discharged is received; and the predetermined stand-by position that is one of positions disposed closer to the accommodating position than the loading position. In the present embodiment, the accommodating position is a position disposed furthest to the second direction side from among positions to which the paper discharge tray TR is able to move toward the second direction. Note that, instead of this, the accommodating position may be other positions at which the paper discharge tray TR is accommodated within the housing, from among positions to which the paper discharge tray TR is able to move toward the second direction. In the present embodiment, the loading position is a position disposed furthest to the first direction side from among positions to which the paper discharge tray TR is able to move toward the first direction. Note that, instead of this, the loading position may be other positions at which the printing medium that has been discharged can be received, from among positions to which the paper discharge tray TR is able to move toward the first direction. The stand-by position will be described later.

The printing apparatus 1 is able to move such a paper discharge tray TR with driving force of the paper feeding motor that has been described above. In the following description, it is assumed that the paper discharge tray TR moves in the first direction as the paper feeding motor rotates in a forward rotational direction whereas the paper discharge tray TR moves in the second direction as the paper feeding motor rotates in a backward rotational direction, as one example. Note that the printing apparatus 1 may be configured such that the paper discharge tray TR moves in the second direction as the paper feeding motor rotates in the forward rotational direction whereas the paper discharge tray TR moves in the first direction as the paper feeding motor rotates in the backward rotational direction. For example, the printing apparatus 1 includes a transmission mechanism (not illustrated) configured to transmit the driving force of the paper feeding motor such that the paper feeding motor can move the paper discharge tray TR when the carriage is disposed at a predetermined position. The transmission mechanism may be a known mechanism that is able to transmit the driving force of the paper feeding motor such that the paper feeding motor is able to move the paper discharge tray TR in the case described above, or may be a mechanism that will be developed in the future.

The printing apparatus 1 having the configuration described above may be configured to include a restricting unit LM configured to restrict the rotation of the operation unit CP from the first operation position to the second operation position when the operation unit CP is disposed at the first operation position. Thus, below, description will be made of a case in which the printing apparatus 1 includes the restricting unit LM as illustrated in FIGS. 4 and 5, as one example.

Figure 4:
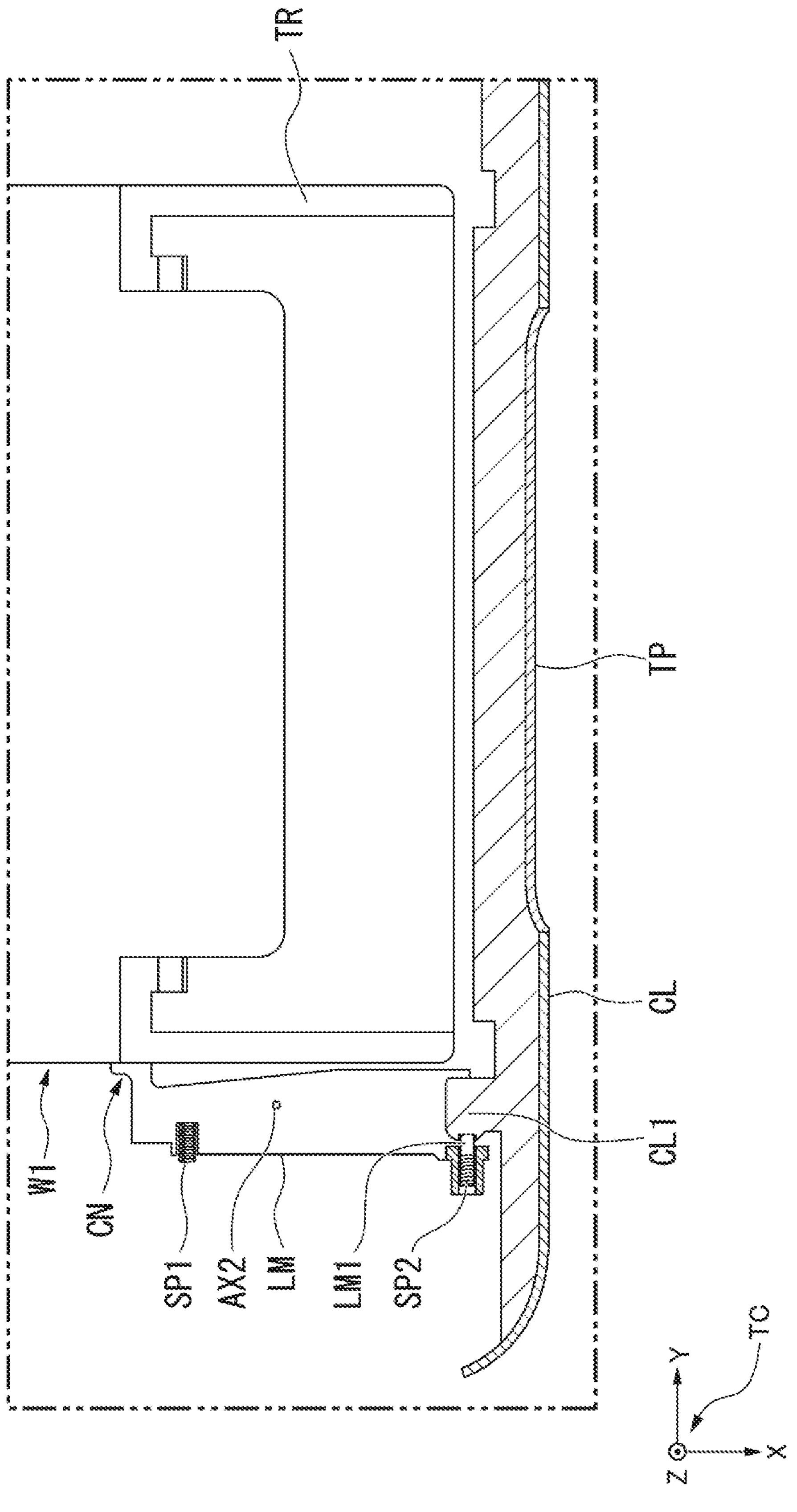
FIG. 4 is a diagram illustrating one example of a state in which rotation of the operation unit CP from a first operation position to a second operation position is restricted by a restricting unit LM when the operation unit CP is disposed at the first operation position.
Figure 5:
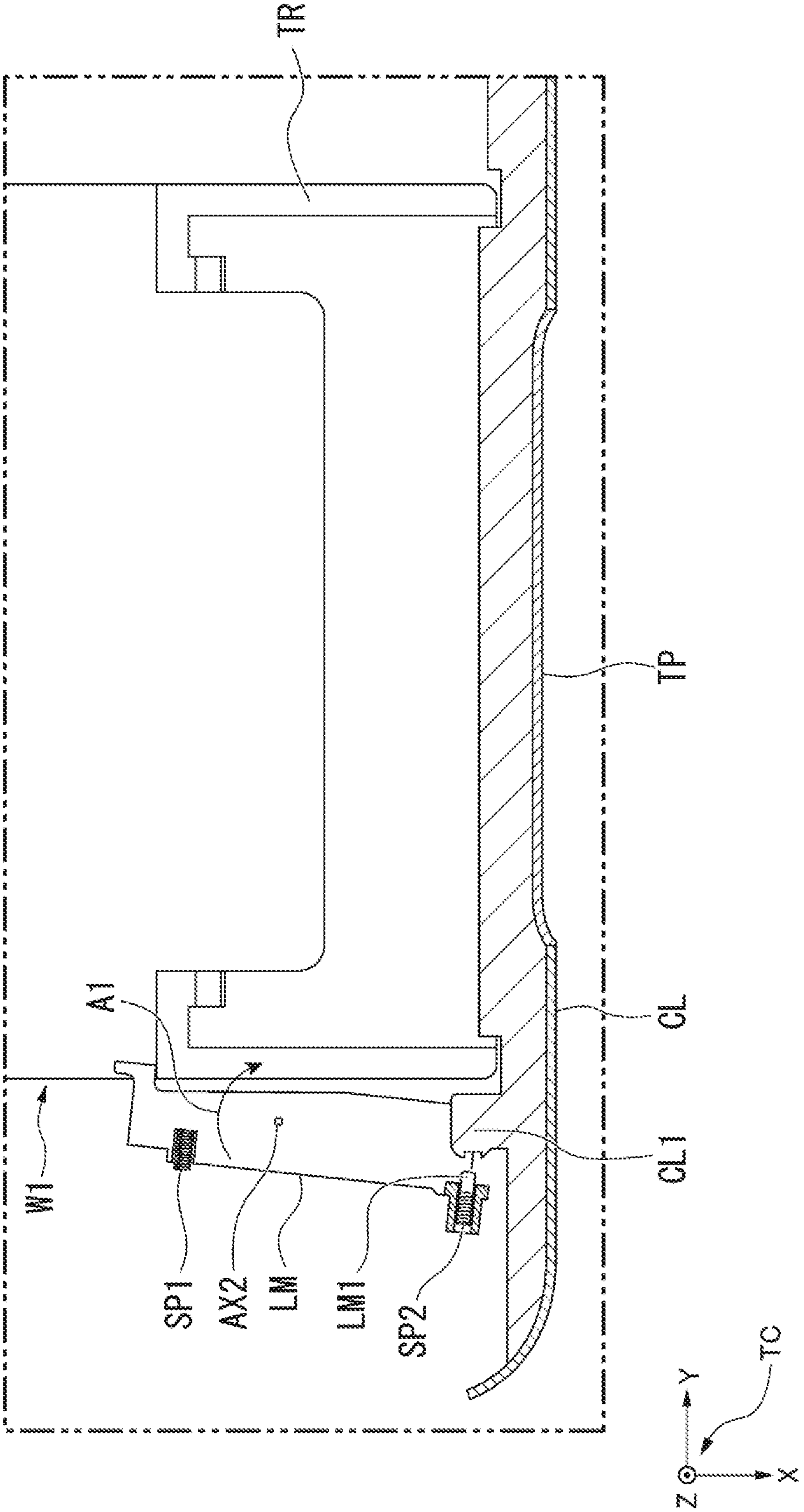
FIG. 5 is a diagram illustrating one example of a state in which restriction by the restricting unit LM illustrated in FIG. 4 is canceled.

FIG. 4 is a diagram illustrating one example of a state in which, when the operation unit CP is disposed at the first operation position, rotation of the operation unit CP from the first operation position to the second operation position is restricted by the restricting unit LM. Here, FIG. 4 is a top view in a case in which the front face of the printing apparatus 1 and its surroundings are viewed from the upward direction toward the downward direction. However, in order to clarify the state of restriction by the restricting unit LM, FIG. 4 only illustrates the operation unit CP, the paper discharge tray TR, and the restricting unit LM, and other members other than these three members are not illustrated.

For example, the restricting unit LM is a lever lock configured to restrict the rotation of the operation unit CP disposed at the first operation position, as illustrated in FIG. 4. In this case, the restricting unit LM is a lever-shaped member provided within the printing apparatus 1 so as to be able to rotate around a rotation axis AX2 parallel to the Z-axis. In FIG. 4, the restricting unit LM is biased by a first biasing member SP1 so as to rotate in a clockwise direction with the rotation axis AX2 being the center. Here, the first biasing member SP1 is, for example, a spring but is not limited to this. In the following description, the clockwise direction in FIG. 4 is simply referred to as a clockwise direction for the purpose of convenience of explanation.

In addition, the restricting unit LM is provided with a lock pin LM1. The lock pin LM1 is a pin biased by a second biasing member SP2 so as to protrude toward the positive direction of the Y-axis from the restricting unit LM. Here, the operation unit CP is provided with an engaging portion CL1 configured to engage with the lock pin LM1 when the restricting unit LM is substantially parallel to the first direction. With this configuration, the operation unit CP disposed at the first operation position is restricted by the restricting unit LM so as not to rotate in the case described above. In other word, in this case, the restricting unit LM applies restriction such that the operation unit CP does not rotate. Note that the second biasing member SP2 is, for example, a spring but is not limited to this.

When the restricting unit LM rotates in the clockwise direction by a predetermined angle or more from a state of being substantially parallel to the first direction, the lock pin LM1 is disengaged from the engaging portion CL1 as illustrated in FIG. 5, and as a result, such restriction of the operation unit CP by the restricting unit LM is canceled. FIG. 5 is a diagram illustrating one example of a state in which the restriction by the restricting unit LM illustrated in FIG. 4 is canceled. The arrow A1 illustrated in FIG. 5 indicates the clockwise direction in which the restricting unit LM rotates. Here, the printing apparatus 1 includes, for example, a not-illustrated member configured to restrict the rotation of the restricting unit LM such that the restricting unit LM does not rotate beyond a predetermined angle from a state in which the restricting unit LM is substantially parallel to the first direction. This member may be any member, provided that the member restricts the rotation of the restricting unit LM such that the restricting unit LM does not rotates beyond the predetermined angle from the state in which the restricting unit LM is substantially parallel to the first direction. In the following description, of states of the restricting unit LM, the state in which the restricting unit LM is substantially parallel to the first direction is referred to as a restricted state, and a state after the restricting unit LM rotates by the predetermined angle from the state in which the restricting unit LM is substantially parallel to the first direction is referred to as a canceled state.

In addition, the state of the restricting unit LM changes depending on the position of the paper discharge tray TR. Note that, in order to prevent the drawing from being complicated, FIG. 5 illustrates a case where the position of the paper discharge tray TR is the accommodating position as with FIG. 4. Thus, the difference between FIG. 4 and FIG. 5 only lies in a difference in states of the restricting unit LM. For example, in the example illustrated in FIG. 4, a contact portion CN configured to come into contact with a plate member W1 of the paper discharge tray TR is provided at an end portion, at the negative direction side of the X-axis, of the restricting unit LM from among end portions of the restricting unit LM. The plate member W1 is a plate-shaped member provided at an end portion, at the negative direction side of the Y-axis, from among end portions that the paper discharge tray TR has. In addition, the plate member W1 is a member configured to protrude from this end portion in the upward direction and extend by a predetermined length toward the second direction from an end portion, at the first direction side, from among end portions that the paper discharge tray TR has. The predetermined length is a length determined depending on a restriction canceling position at which the restriction of the operation unit CP by the restricting unit LM is canceled. Specifically, the predetermined length is determined as a length with which the contact portion CN comes into contact with the plate member W1 within a first section extending from the accommodating position to the restriction canceling position in a section in which the paper discharge tray TR is able to move, and the contact portion CN does not come into contact with the plate member W1 within a second section extending from the restriction canceling position to the loading position in a section on and after the restriction canceling position toward the first direction. With such a plate member W1 being provided at the paper discharge tray TR, the restricting unit LM is supported by the plate member W1 and is kept in the restricting state as illustrated in FIG. 4 when the paper discharge tray TR is located in the first section. On the other hand, when the paper discharge tray TR is located in the second section, the restricting unit LM is maintained in the canceling state as illustrated in FIG. 5. Thus, when the paper discharge tray TR moves from the accommodating position to the restriction canceling position, the restricting unit LM that restricts the operation unit CP disposed at the first operation position is turned from the restricting state into the canceling state, and as a result, cancels the restriction of the operation unit CP. In other words, when the position of the paper discharge tray TR matches the restriction canceling position, the restricting unit LM turns from the restricting state into the canceling state, and as a result, cancels the restriction of the operation unit CP. Such a restriction canceling position is a position disposed between the loading position and the accommodating position that have been described above. Note that the restriction canceling position may match the stand-by position described above or may not match the stand-by position. Below, description will be made of a case in which the restriction canceling position is disposed between the stand-by position and the accommodating position, as one example. In this case, when the paper discharge tray TR passes through between the accommodating position and the stand-by position, the restricting unit LM is turned from the restricting state into the canceling state.

Hardware Configuration of Printing Apparatus

Figure 6:
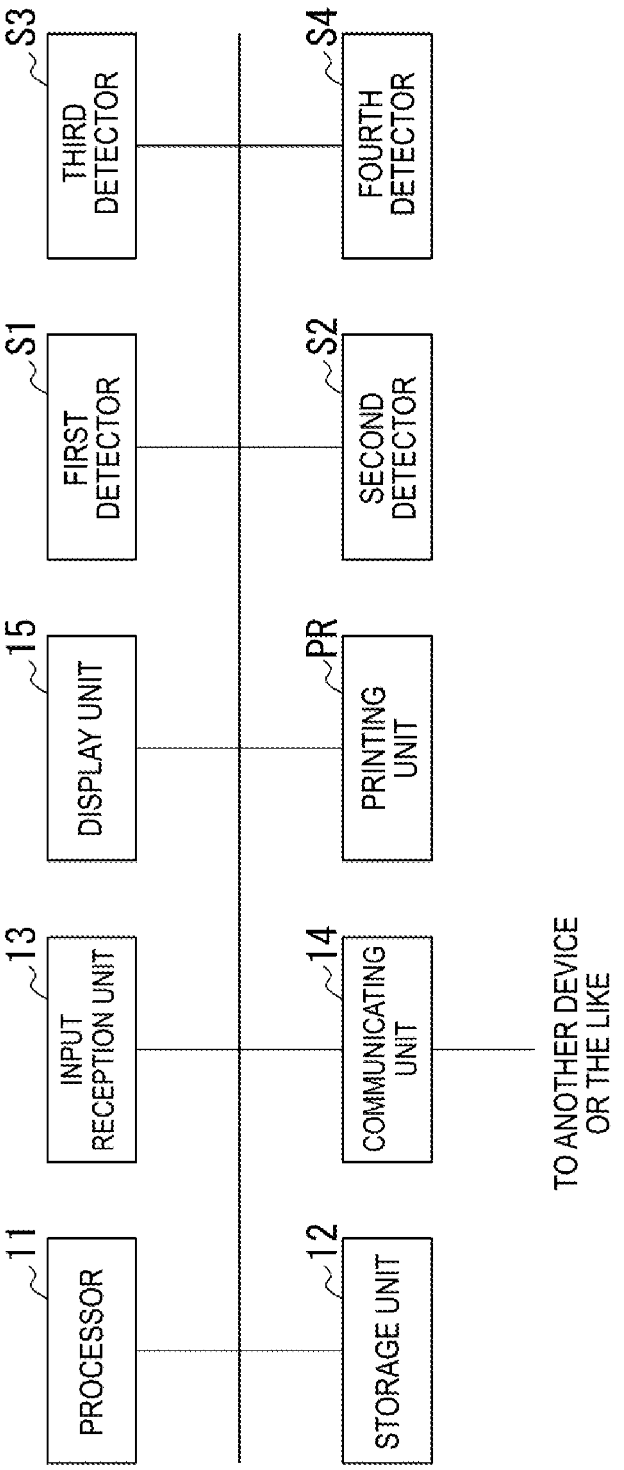
FIG. 6 is a diagram illustrating one example of a configuration of hardware of the printing apparatus 1.

Below, the hardware configuration of the printing apparatus 1 will be described with reference to FIG. 6. FIG. 6 is a diagram illustrating one example of the hardware configuration of the printing apparatus 1.

The printing apparatus 1 includes a processor 11, a storage unit 12, an input reception unit 13, a communicating unit 14, a display unit 15, the printing unit PR, a first detector S1, a second detector S2, a third detector S3, and a fourth detector S4. These constituent elements are coupled through a bus in a manner that they can communicate with each other. In addition, the printing apparatus 1 communicates with other devices through the communicating unit 14.

The processor 11 is, for example, a central processing unit (CPU). Note that, instead of the CPU, the processor 11 may be other processors such as a field programmable gate array (FPGA). The processor 11 executes various types of programs stored in the storage unit 12.

The storage unit 12 includes, for example, a hard disk drive (HDD), a solid state drive (SSD), an electrically erasable programmable read only memory (EEPROM), a read only memory (ROM), a random access memory (RAM), or the like. Note that, rather than being included within the printing apparatus 1, the storage unit 12 may be an externally provided storage device coupled through a digital input-output port or the like such as a Universal Serial Bus (USB). The storage unit 12 stores various types of information, various types of programs, and the like that the printing apparatus 1 processes.

The input reception unit 13 is configured to receive an operation made by a user who performs the operation while viewing an image displayed on the display unit 15. In this one example, the input reception unit 13 together with the display unit 15 is integrally configured as the touch panel TP. Note that the input reception unit 13 may be configured so as to include a hardware key that receives an operation from a user. In addition, the input reception unit 13 may have a configuration in which the hardware key is included while no touch panel TP is provided.

The communicating unit 14 is configured to include, for example, a digital input-output port such as USB, an Ethernet (registered trademark) port, and the like.

The display unit 15 displays an image. The display unit 15 is a display device including, for example, a liquid crystal display panel, an organic Electro Luminescence (EL) display panel, or the like, which serve as a display unit included in the printing apparatus 1.

The printing unit PR employs an ink-jet type to print an image on the printing medium in response to the operation received from a user through the touch panel TP. As described above, the printing unit PR includes: the paper feeding motor; the plurality of paper feeding rollers driven by the paper feeding motor; the printing head configured to discharge a liquid such as ink onto the printing medium; the carriage configured to move the printing head in the scanning direction; and the like. In the following description, the paper feeding motor included in the printing unit PR is referred to as a paper feeding motor MV for the purpose of convenience of explanation. The paper feeding motor MV serves as one example of a movement unit.

The first detector S1 is configured to detect whether or not the position of the operation unit CP is the second operation position. The first detector S1 may be any sensor, provided that the sensor is able to detect whether or not the position of the operation unit CP is the second operation position, and is, for example, a mechanical switch, an optical sensor, or the like.

The second detector S2 is configured to detect whether or not the position of the paper discharge tray TR is the stand-by position. The second detector S2 may be any sensor, provided that the sensor is able to detect whether or not the position of the paper discharge tray TR is the stand-by position, and is, for example, a mechanical switch, an optical sensor, or the like.

The third detector S3 is configured to detect whether or not the position of the paper discharge tray TR is the loading position. The third detector S3 may be any sensor, provided that the sensor is able to detect whether or not the position of the paper discharge tray TR is the loading position, and is, for example, a mechanical switch, an optical sensor, or the like.

The fourth detector S4 is configured to detect whether or not the position of the paper discharge tray TR is the accommodating position. The fourth detector S4 may be any sensor, provided that the sensor is able to detect whether or not the position of the paper discharge tray TR is the accommodating position, and is, for example, a mechanical switch, an optical sensor, or the like.

Functional Configuration of Printing Apparatus

Figure 7:
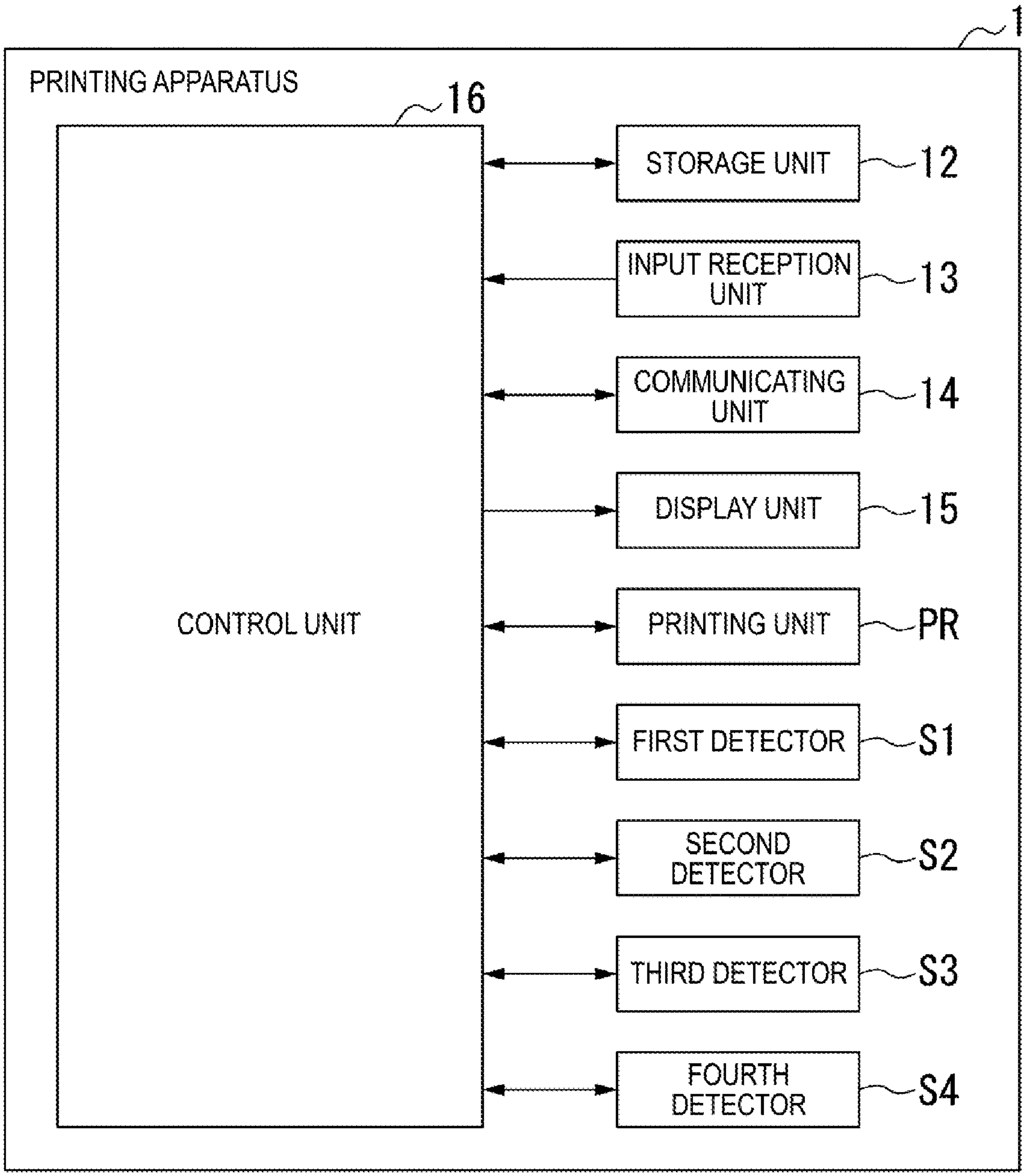
FIG. 7 is a diagram illustrating one example of a functional configuration of the printing apparatus 1.

Below, the functional configuration of the printing apparatus 1 will be described with reference to FIG. 7. FIG. 7 is a diagram illustrating one example of the functional configuration of the printing apparatus 1.

The printing apparatus 1 includes the storage unit 12, the input reception unit 13, the communicating unit 14, the display unit 15, the printing unit PR, the first detector S1, the second detector S2, the third detector S3, the fourth detector S4, and the control unit 16.

The control unit 16 controls the entire printing apparatus 1. For example, the processor 11 executes various types of programs stored in the storage unit 12 to achieve the control unit 16. In addition, a portion of or all of the functions that the control unit 16 has are achieved with a hardware functional unit such as a large scale integration (LSI), an application specific integrated circuit (ASIC), and the like.

Configuration of a rotating mechanism that rotates the operation unit in association with movement of the paper discharge tray.

Figure 8:
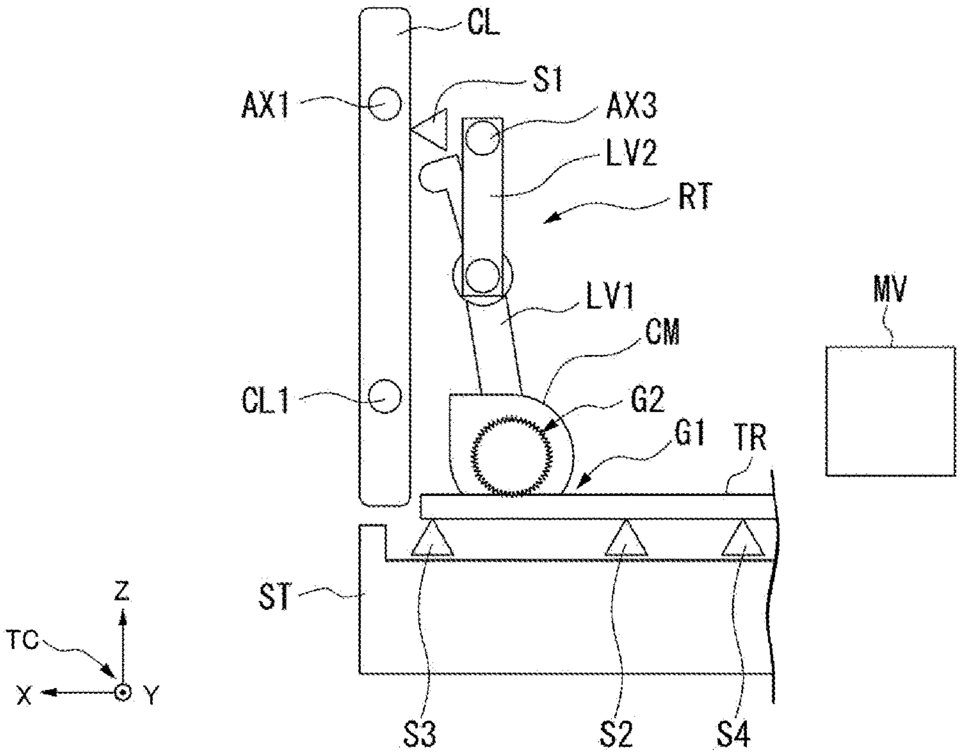
FIG. 8 is a diagram illustrating one example of a configuration of a rotating mechanism RT.

The printing apparatus 1 further includes a rotating mechanism RT configured to cause the operation unit CP disposed at the first operation position to rotate to the second operation position in association with movement of the paper discharge tray TR. Thus, below, with reference to FIG. 8, description will be made of the rotating mechanism RT configured to cause the operation unit CP disposed at the first operation position to rotate to the second operation position in association with movement of the paper discharge tray TR. FIG. 8 is a diagram illustrating one example of the configuration of the rotating mechanism RT. In addition, FIG. 8 is a side view of the rotating mechanism RT when the rotating mechanism RT is viewed toward the negative direction of the Y-axis. In the example illustrated in FIG. 8, the operation unit CP is disposed at the first operation position. Furthermore, in this example, the paper discharge tray TR is disposed at the accommodating position. Note that individual positions of the first detector S1 to the fourth detector S4 illustrated in FIG. 8 are illustrated as imaginary positions and are given for the purpose of convenience. Thus, these illustrated positions differ from positions at which the first detector S1 to the fourth detector S4 are actually located. In addition, the configuration of the rotating mechanism RT illustrated in FIG. 8 is given merely as one example. Thus, the rotating mechanism may have other configuration, provided that this mechanism is able to cause the operation unit CP disposed at the first operation position to rotate to the second operation position. Furthermore, in FIG. 8, in order to avoid complicating the drawing, the paper feeding motor MV is illustrated as a rectangular-shape object. In addition, in order to avoid complicating the drawing, FIG. 8 does not illustrate a mechanism that causes the paper feeding motor MV to move the paper discharge tray TR.

In the example illustrated in FIG. 8, the rotating mechanism RT includes a rack toothed gear G1 provided at the paper discharge tray TR, a cam-equipped toothed gear G2 engaged with the rack toothed gear G1, a lever member LV1 engaged with a cam unit CM of the cam-equipped toothed gear G2, and a lever member LV2 configured to support the lever member LV1. Note that the rotating mechanism RT may have a configuration in which no lever member LV2 is provided.

Here, of end portions of the lever member LV2, an end portion at one side is supported by a predetermined rotation axis AX3 so as to be able to rotate. Note that the rotation axis AX3 is an axis provided at the housing (not illustrated) of the printing apparatus 1. In addition, of end portions of the lever member LV2, an end portion at the other side is coupled at or around the center of the lever member LV1 so as to be able to rotate. In addition, one end of the end portions of the lever member LV1 is in contact with the cam unit CM of the cam-equipped toothed gear G2.

The cam unit CM of the cam-equipped toothed gear G2 starts to rotate in response to movement of the paper discharge tray TR from the accommodating position in the first direction. Subsequently, as the paper discharge tray TR passes across the restriction canceling position, restriction of the operation unit CP by the restricting unit LM is canceled, and then, the cam unit CM starts to lift the lever member LV1. Then, as the lever member LV1 starts to be lifted, the lever member LV2 starts to rotate. Then, of end portions of the lever member LV1, an end portion of the lever member LV1 that is not in contact with the cam unit CM is brought into contact with the operation unit CP, and starts to push the operation unit CP in the opening direction. This makes the operation unit CP rotate from the first operation position to the second operation position. That is, the operation unit CP rotates from the first operation position to the second operation position in association with movement of the paper discharge tray TR in the first direction. Note that this end portion serves as one example of a pressing unit of the lever member.

Figure 9:
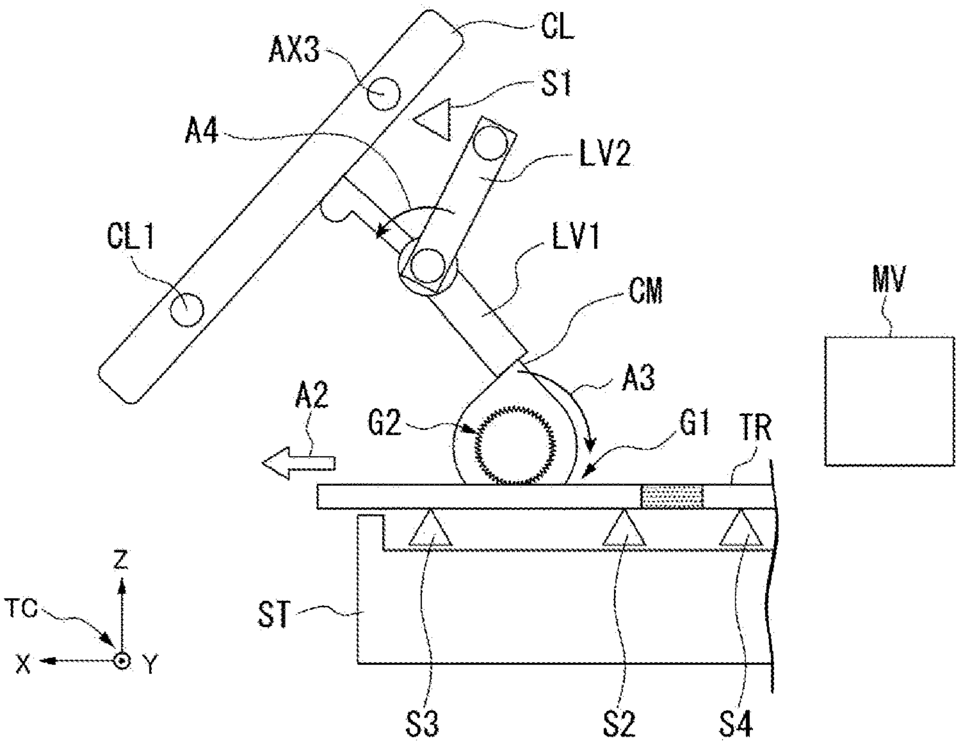
FIG. 9 is a diagram illustrating one example of a state immediately after a paper discharge tray TR illustrated in FIG. 8 is moved to a stand-by position.

FIG. 9 is a diagram illustrating one example of a state immediately after the paper discharge tray TR illustrated in FIG. 8 moves to the stand-by position. As the paper discharge tray TR moves from the accommodating position to the stand-by position toward the first direction indicated by the arrow A2 as illustrated in FIG. 9, the cam unit CM of the cam-equipped toothed gear G2 rotates toward a direction indicated by the arrow A3 as described above. This causes the lever member LV1 to be lifted by the cam unit CM and come into contact with the operation unit CP. Thus, with the contacting portion between the lever member LV2 and the lever member LV1 being the fulcrum, the lever member LV1 rotates in a direction indicated by the arrow A4 and pushes upward the operation unit CP such that the operation unit CP rotates toward the opening direction. This enables the operation unit CP to rotate from the first operation position to the second operation position. Here, the position at which the operation unit CP illustrated in FIG. 9 is disposed serves as one example of the second operation position.

Note that, in this one example, an end portion, at the first direction side, from among end portions of the paper discharge tray TR disposed at the stand-by position is disposed more toward the second direction side than an end portion, at the first direction side, from among end portions of the operation unit CP at the second operation position, as illustrated in FIG. 9. With this configuration, when the paper discharge tray TR is disposed at the stand-by position, the printing apparatus 1 is able to hide the paper discharge tray TR behind the operation unit CP. Thus, for example, as a user moves the paper discharge tray TR into the housing of the printing apparatus 1, the printing apparatus 1 makes it possible to prevent a user from being confused during an operation. Furthermore, by hiding the paper discharge tray TR behind the operation unit CP, the printing apparatus 1 makes it possible to prevent the paper discharge tray TR from coming into contact with the body of a user, an object located around the printing apparatus 1, or the like.

In addition, in this one example, of end portions of the paper discharge tray TR disposed at the stand-by position, an end portion at the first direction side is disposed more toward the first direction side than an end portion, at the first direction side, from among end portions of the accommodating unit ST, as illustrated in FIG. 9. Note that it may be possible to employ a configuration in which, of end portions of the paper discharge tray TR disposed at the stand-by position, an end portion at the first direction side is disposed more toward the second direction side than an end portion, at the first direction side, from among end portions of the accommodating unit ST. In this case, even when the paper discharge tray TR is disposed at the stand-by position, the printing apparatus 1 allows a user to remove the accommodating unit ST. This makes it possible to suppress a deterioration in convenience of the user.

Figure 10:
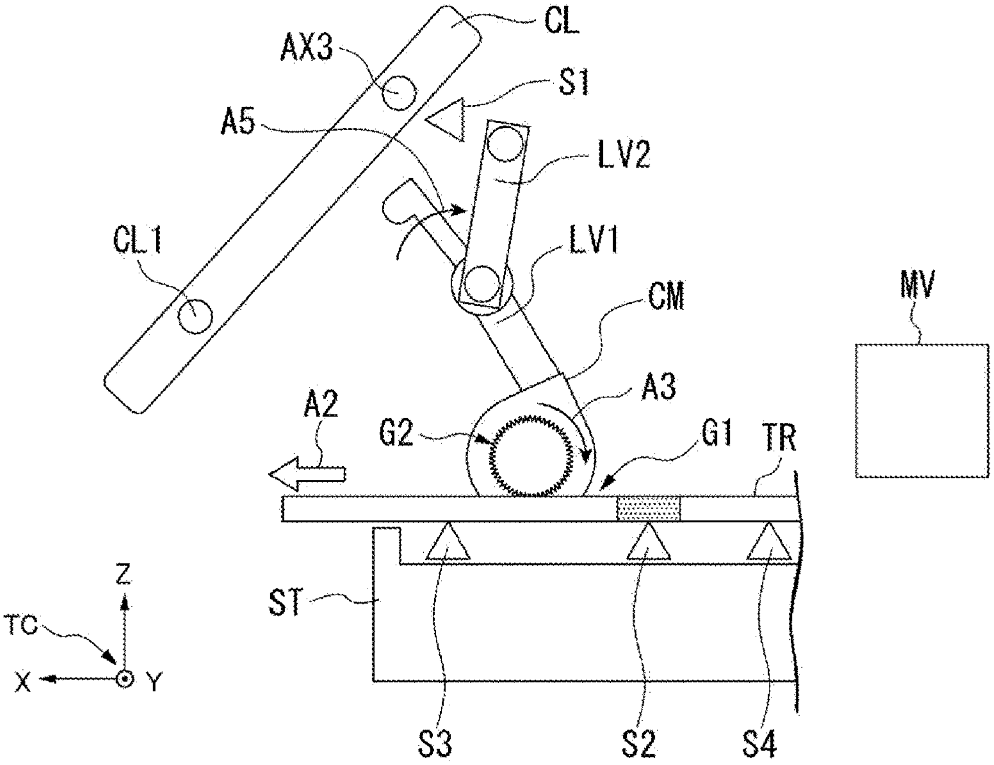
FIG. 10 is a diagram illustrating one example of a state immediately after the paper discharge tray TR illustrated in FIG. 9 moves to a position between the stand-by position and the loading position.

Furthermore, FIG. 10 is a diagram illustrating one example of a state immediately after the paper discharge tray TR illustrated in FIG. 9 moves to a position between the stand-by position and the loading position. During a process in which the paper discharge tray TR moves from the stand-by position to a position between the stand-by position and the loading position, the lever member LV1 is lifted by the cam unit CM of the cam-equipped toothed gear G2 to the highest position, and then, starts to descend in association with rotation of the cam unit CM. Thus, with the connecting portion between the lever member LV2 and the lever member LV1 being the fulcrum, the lever member LV1 moves away from the operation unit CP while rotating in a direction indicated by the arrow A5.

Figure 11:
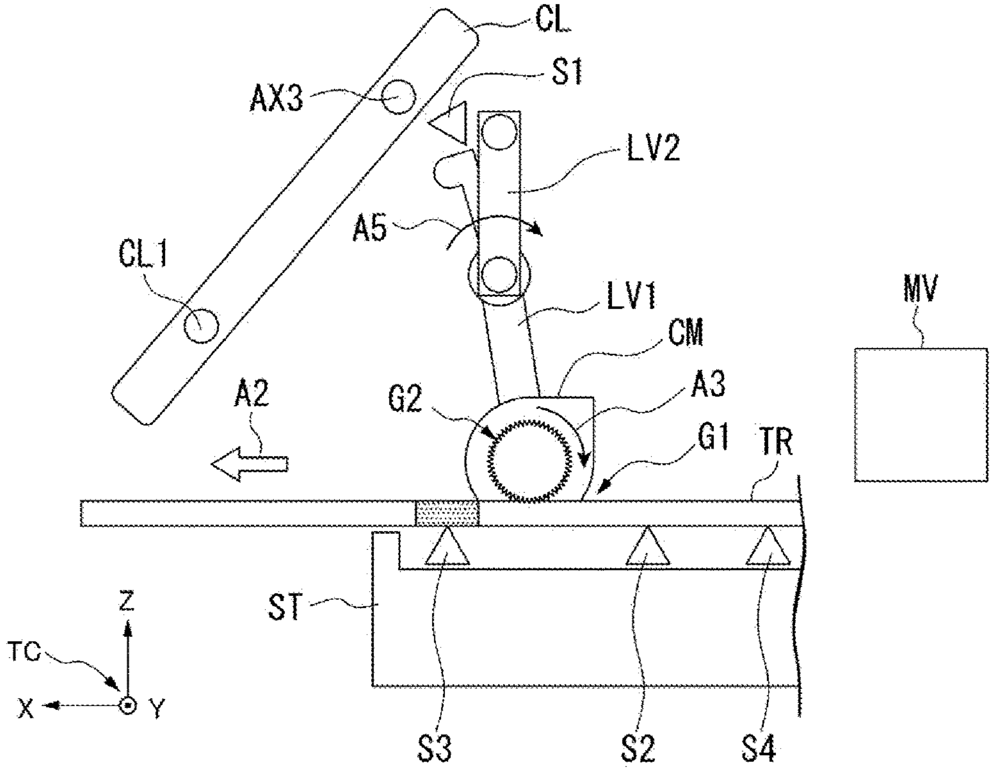
FIG. 11 is a diagram illustrating one example of a state immediately after the paper discharge tray TR illustrated in FIG. 10 moves to the loading position.

In addition, FIG. 11 is a diagram illustrating one example of a state immediately after the paper discharge tray TR illustrated in FIG. 10 moves to the loading position. As the paper discharge tray TR moves to the loading position, the state of the rotating mechanism RT turns into substantially the same state as the state illustrated in FIG. 8, that is, the state of the rotating mechanism RT when the paper discharge tray TR is disposed at the accommodating position, except for the state of the cam-equipped toothed gear G2.

In this manner, the operation unit CP rotates from the first operation position to the second operation position in association with movement of the paper discharge tray TR to the first direction with driving force of the paper feeding motor MV. That is, by moving the paper discharge tray TR from the accommodating position toward the first direction, the printing apparatus 1 is able to rotate the operation unit CP from the first operation position to the second operation position. Note that, by moving the paper discharge tray TR toward the second direction when the paper discharge tray TR is disposed at the loading position and the operation unit CP is disposed at the first operation position, the rotating mechanism RT is able to rotate the operation unit CP from the first operation position to the second operation position. At this time, the rotating mechanism RT moves in a sequence inverted to the sequence of the rotating mechanism RT that has been described with reference to FIGS. 8 to 11, and pushes upward the operation unit CP by the lever member LV1. Thus, in the present embodiment, description will not be made of the movement of the rotating mechanism RT due to the movement of the paper discharge tray TR toward the second direction in this case.

Figure 12:
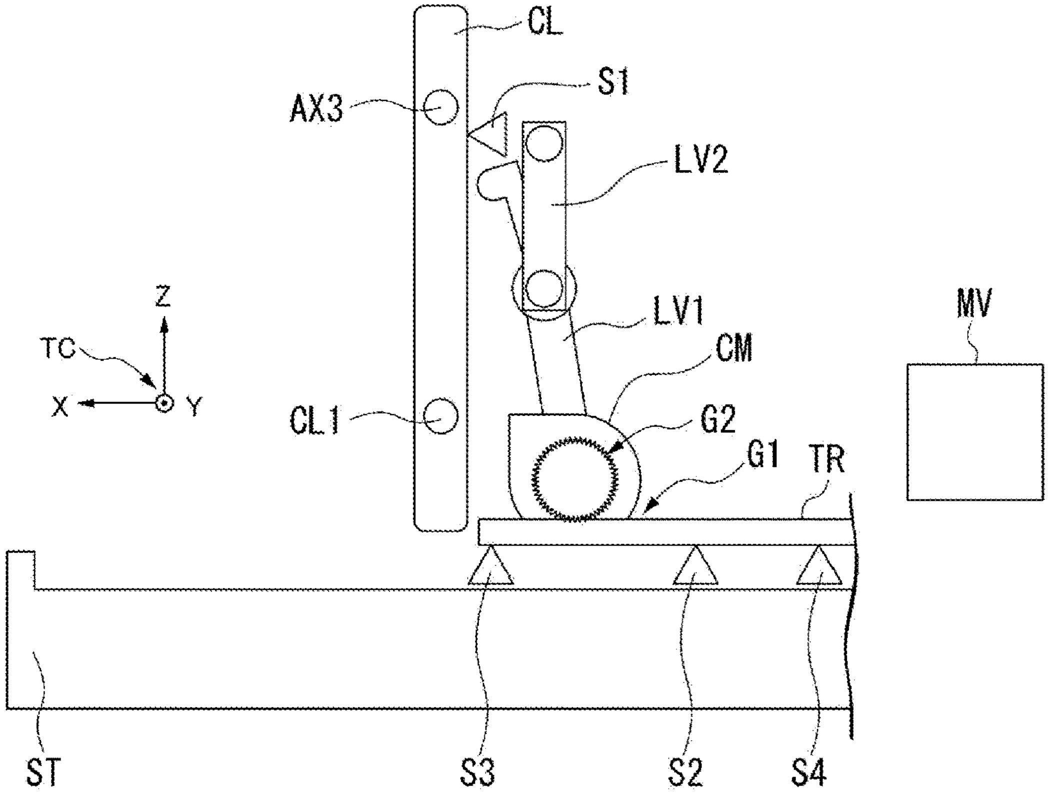
FIG. 12 is a diagram illustrating another example of a positional relationship between the front face of an accommodating unit ST and the front face of the operation unit CP disposed at the first operation position.

Note that, in FIGS. 8 to 11, the front face of the accommodating unit ST is flush with the front face of the operation unit CP disposed at the first operation position. However, it may be possible to employ a configuration in which the front face of the accommodating unit ST is disposed more toward the first direction side than the front face of the operation unit CP disposed at the first operation position, as illustrated in FIG. 12. FIG. 12 is a diagram illustrating another example of a positional relationship between the front face of the accommodating unit ST and the front face of the operation unit CP disposed at the first operation position. Note that the front face of the accommodating unit ST is a surface at the positive direction side of the X-axis from among surfaces that the accommodating unit ST has. Furthermore, the front face of the operation unit CP disposed at the first operation position is a surface disposed at the positive direction side of the X-axis from among surfaces that the operation unit CP disposed at the first operation position has. In addition, the position disposed more toward the near side than the front face of the operation unit CP disposed at the first operation position is a position disposed more toward the positive direction side of the X-axis than this front face.

Process in which the control unit turns the state of the printing apparatus into a predetermined first state.

Below, with reference to FIG. 15, description will be made of a process in which the control unit 16 turns the state of the printing apparatus 1 into a predetermined first state. Here, the first state represents one example of a state of the printing apparatus 1 from among states of the printing apparatus 1 in which a user is assumed to easily perform an operation. Below, description will be made of a case in which the state of the printing apparatus 1 is the first state when the operation unit CP is disposed at the second operation position and the paper discharge tray TR is disposed at the stand-by position, as one example. When the state of the printing apparatus 1 is the first state, a user is able to easily visually recognize the operation unit CP; it is possible to reduce a period of time necessary to move the paper discharge tray TR to the loading position as compared with a case where the paper discharge tray TR is disposed at the accommodating position; it is possible to reduce a period of time necessary to move the paper discharge tray TR to the accommodating position as compared with a case where the paper discharge tray TR is disposed at the loading position; and it is possible to prevent the paper discharge tray TR from coming into contact with other objects. Thus, of states of the printing apparatus 1, the first state is a state in which it is expected that a user is able to easily perform an operation, as described above.

Figure 13:
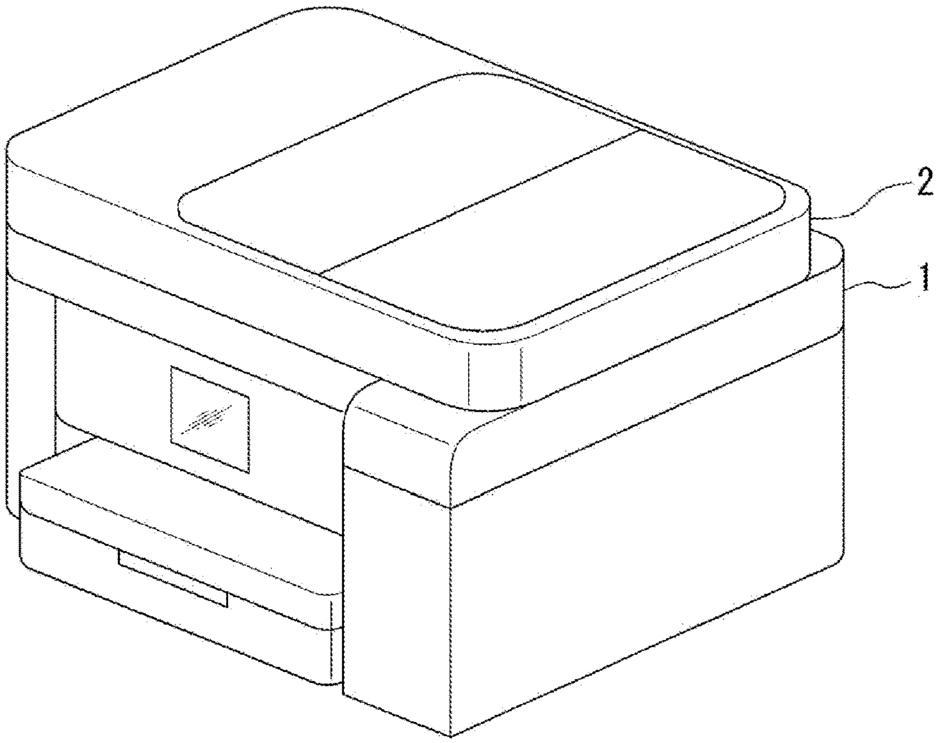
FIG. 13 is a diagram illustrating one example of a state of the printing apparatus 1 to which an ADF 2 is attached.
Figure 14:
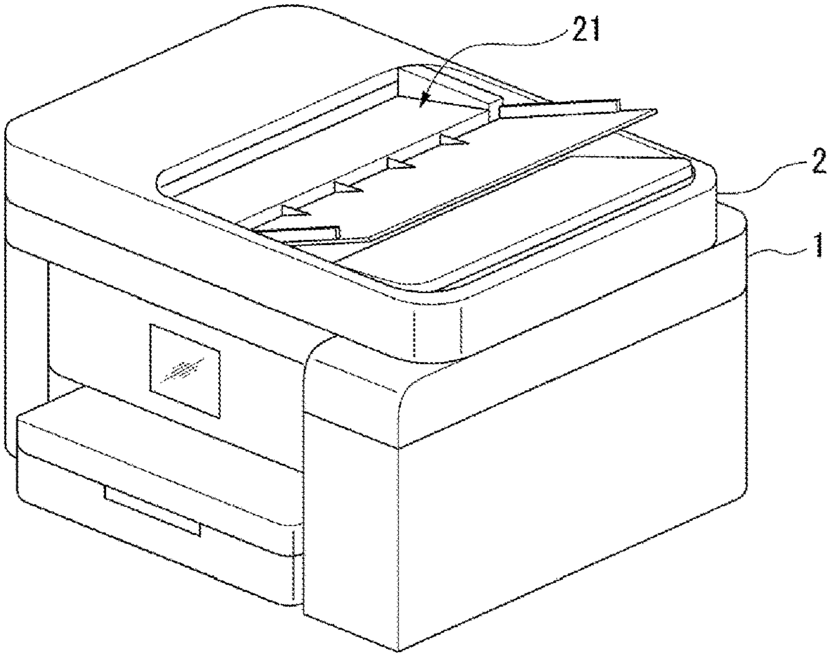
FIG. 14 is a diagram illustrating one example of a state in which a mounting platform 21 of the ADF 2 illustrated in FIG. 13 is opened.

When a predetermined first condition is satisfied, the control unit 16 turns the state of the printing apparatus 1 into the first state. The first condition may be any condition, provided that the condition is satisfied at timing when it is estimated that a user wishes to turn the state of the printing apparatus 1 into the first state. For example, the first condition is a condition in which the power of the printing apparatus 1 is turned on. In this case, when the power of the printing apparatus 1 is turned on, the control unit 16 causes the state of the printing apparatus 1 to be turned into the first state. Thus, immediately after the power of the printing apparatus 1 is turned on, it is possible to turn the state of the printing apparatus 1 into the first state that is a state in which a user is expected to easily perform an operation. This makes it possible to improve the convenience of the user. Note that, instead of this or in addition to this, the first condition may be a portion of or all of recovering from an energy saving mode, receiving a touch operation to the touch panel TP, detecting, by an optical sensor, attachment or detachment of the accommodating unit ST, detecting, by an optical sensor, insertion of a printing medium into a manual feeding tray, detecting, by an optical sensor, that an original document is placed on a mounting platform of an auto document feeder (ADF) 2 attached to the printing apparatus 1, placing an original document on an original-document stage of a scanner of the printing apparatus 1, and the like. Here, FIG. 13 is a diagram illustrating one example of a state of the printing apparatus 1 to which the ADF 2 is attached. The ADF 2 is attached, for example, at an upper portion of the printing apparatus 1 as illustrated in FIG. 13. In FIG. 13, the mounting platform of the ADF is closed. FIG. 14 is a diagram illustrating one example of a state in which the mounting platform 21 of the ADF 2 illustrated in FIG. 13 is opened. Note that the printing apparatus 1 may have a configuration in which such an ADF 2 can be attached, or may have a configuration in which the ADF 2 cannot be attached. Furthermore, the original-document stage of the scanner is a stage on which an original document to be read by the scanner is placed. The scanner serves as one example of a reading unit configured to detect whether or not an original document is placed on such an original-document stage, and read image information indicating an image on the original document placed on the original-document stage. For example, the reading unit performs pre-scanning of an original document placed on the original-document stage to detect whether or not an original document is placed on the original-document stage. Note that the printing apparatus 1 may have a configuration in which such a scanner is provided, or may have a configuration in which no scanner is provided. In addition, the printing apparatus 1 may be configured so as to be able to select, as the first condition, one or more conditions from among these plurality of conditions described above, in accordance with an operation from a user. Here, when the first condition includes a plurality of conditions, the printing apparatus 1 may determine that the first condition is satisfied when all of these plurality of conditions are satisfied, or may determine that the first condition is satisfied when at least one of these plurality of conditions is satisfied. Furthermore, when the first condition is to recover from an energy saving mode, the printing apparatus 1 is able to turn the state of the printing apparatus 1 into the first state in which a user is assumed to be able to easily operate, immediately after recovery from the energy saving mode. This makes it possible to improve the convenience of the user.

Figure 15:
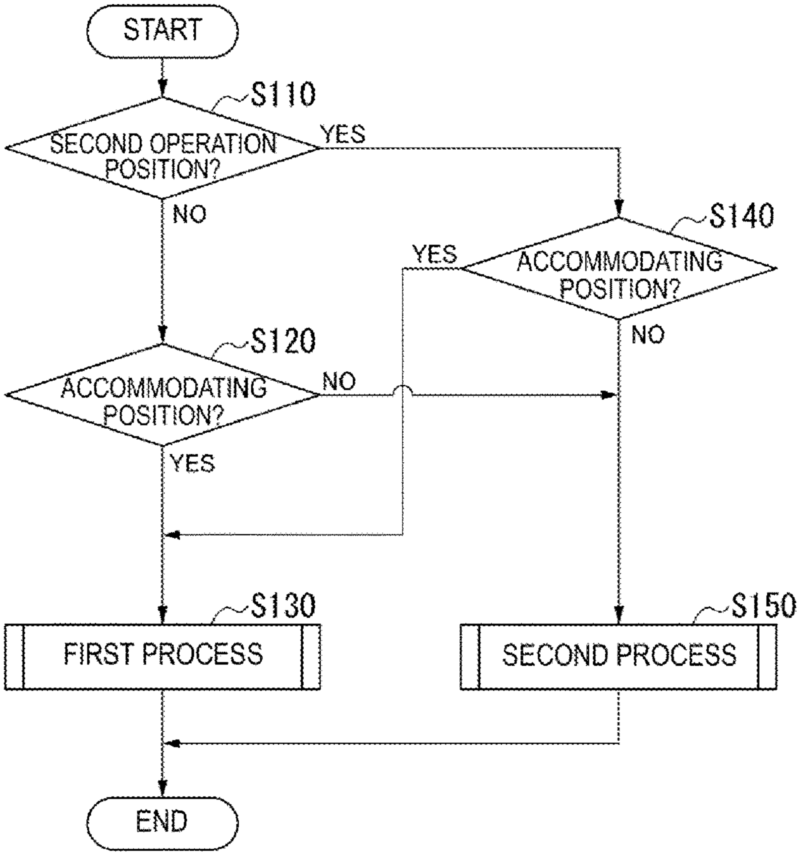
FIG. 15 is a diagram illustrating one example of a flow of a process in which a control unit 16 turns the state of the printing apparatus 1 into a predetermined first state.

FIG. 15 is a diagram illustrating one example of a flow of a process in which the control unit 16 turns the state of the printing apparatus 1 into the predetermined first state. Below, description will be made of a case in which the first condition is satisfied at timing before a process of step S110 illustrated in FIG. 15 is performed, as one example. In addition, below, description will be made of a case in which the position of the operation unit CP is not the second operation position, and a case in which the position of the operation unit CP matches the first operation position, as one example, for the purpose of simplifying explanation.

After the first condition is satisfied, the control unit 16 determines whether or not the position of the operation unit CP is the second operation position, on the basis of a result of detection by the first detector S1 (step S110).

When determining that the position of the operation unit CP is the first operation position (NO in step S110), the control unit 16 determines whether or not the position of the paper discharge tray TR is the accommodating position on the basis of a result of detection by the fourth detector S4 (step S120).

When determining that the position of the paper discharge tray TR is the accommodating position (YES in step S120), the control unit 16 performs a predetermined first process (step S130).

Figure 16:
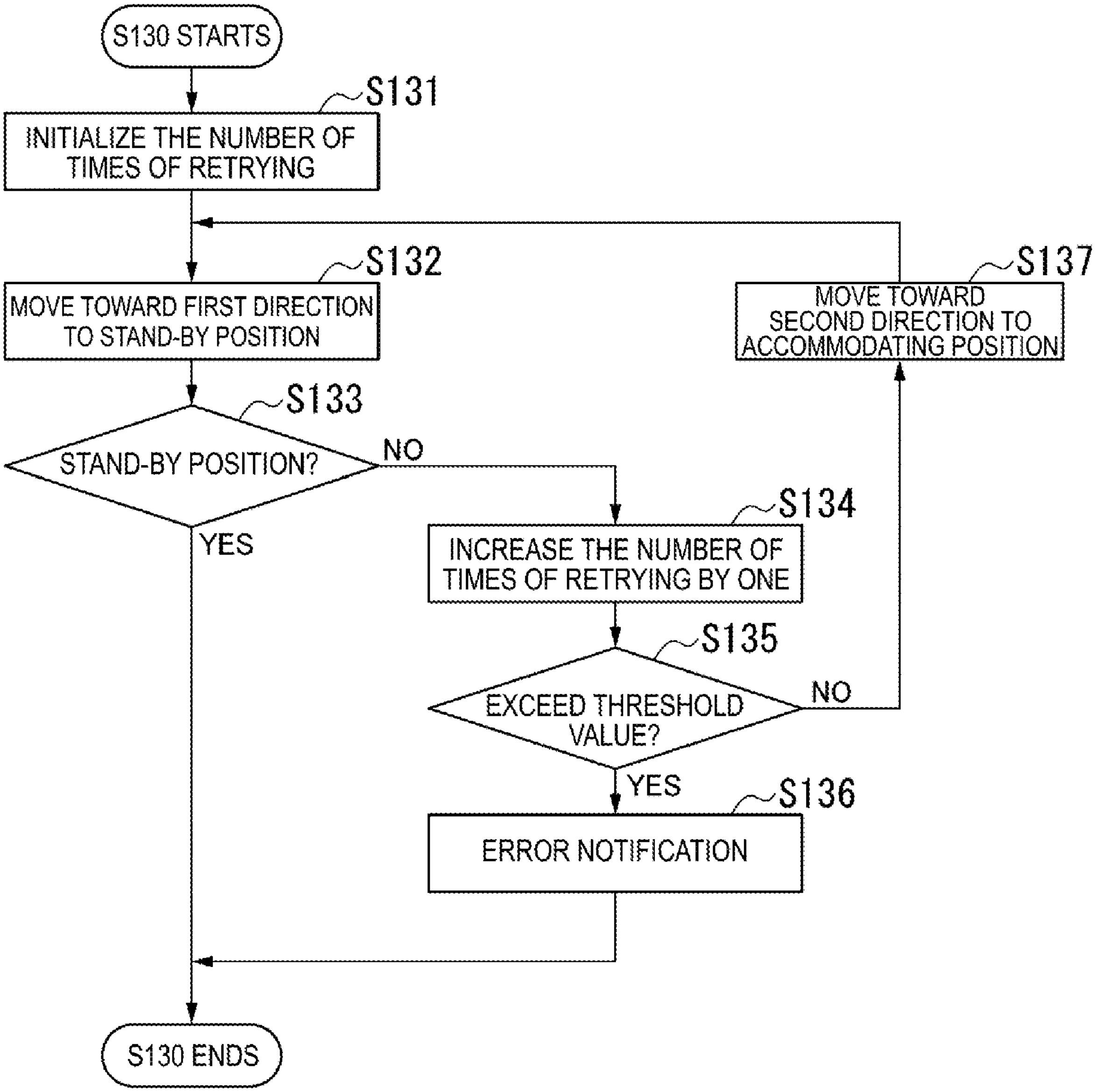
FIG. 16 is a diagram illustrating one example of a flow of a first process of step S130.

Here, FIG. 16 is a diagram illustrating one example of a flow of the first process of step S130.

The control unit 16 generates, within a storage region of the storage unit 12, a retrying-times variable that holds the number of times of retrying indicating the number of times that a process of step S132 described later is performed. Then, the control unit 16 initializes, to zero, a value held in the generated retrying-times variable (step S131). In FIG. 16, the process of step S131 is indicated as "Initialize the number of times of retrying". Note that, in step S131, when a retrying-times variable is stored in the storage unit 12, the control unit 16 may have a configuration in which generation of the retrying-times variable is not performed.

Next, after causing a carriage (not illustrated) to move to a predetermined position, the control unit 16 controls the paper feeding motor MV to move the paper discharge tray TR toward the first direction to the stand-by position (step S132). With this configuration, the printing apparatus 1 is able to cancel the restriction of the operation unit CP by the restricting unit LM, and rotate the position of the operation unit CP from the first operation position to the second operation position. Note that, in step S132, when the carriage has already been disposed at the predetermined position, the control unit 16 skips the movement of the carriage.

Next, the control unit 16 determines whether or not the position of the paper discharge tray TR is the stand-by position on the basis of a result of detection by the second detector S2 (step S133).

When determining that the position of the paper discharge tray TR is the stand-by position (YES in step S133), the control unit 16 ends the process of the flowchart illustrated in FIG. 16, that is, ends the process of step S130 illustrated in FIG. 15.

On the other hand, when determining that the position of the paper discharge tray TR is not the stand-by position (NO in step S133), the control unit 16 increases, by one, the value of the number of times of retrying held in the retrying-times variable described above (step S134).

Next, the control unit 16 determines whether or not the number of times of retrying held in the retrying-times variable exceeds a predetermined threshold value (step S135). Here, the predetermined threshold value is, for example, three. However, the predetermined threshold value may be one, or may be two, or may be an integer not less than four.

When determining that the number of times of retrying held in the retrying-times variable exceeds the predetermined threshold value (YES in step S135), the control unit 16 determines that an abnormality happens and the position of the paper discharge tray TR is not able to move to the stand-by position, and generates an image for making notification of an error indicating that the position of the paper discharge tray TR is not able to move to the stand-by position. Then, the control unit 16 causes the touch panel TP to display the generated image (step S136). In FIG. 16, the process of step S136 is indicated as "Error Notification". After the process of step S136 is performed, the control unit 16 ends the process of the flowchart illustrated in FIG. 16, that is, the first process of step S130 illustrated in FIG. 15.

On the other hand, when determining that the number of times of retrying held in the retrying-times variable does not exceed the predetermined threshold value (NO in step S135), the control unit 16 controls the paper feeding motor MV to move the paper discharge tray TR toward the second direction to the accommodating position (step S137). Then, the control unit 16 moves to step S132, and controls the paper feeding motor MV to move the paper discharge tray TR toward the first direction to the stand-by position again.

After the process of step S130 as described above is performed, the control unit 16 ends the process of the flowchart illustrated in FIG. 15. In this manner, when the first condition is satisfied in a case where the position of the operation unit CP is the first operation position and the position of the paper discharge tray TR is the accommodating position, the printing apparatus 1 performs the first process. This makes it possible to turn the state of the printing apparatus 1 into the first state.

On the other hand, when determining that the position of the paper discharge tray TR is not the accommodating position (NO in step S120), the control unit 16 performs a predetermined second process (step S150).

Figure 17:
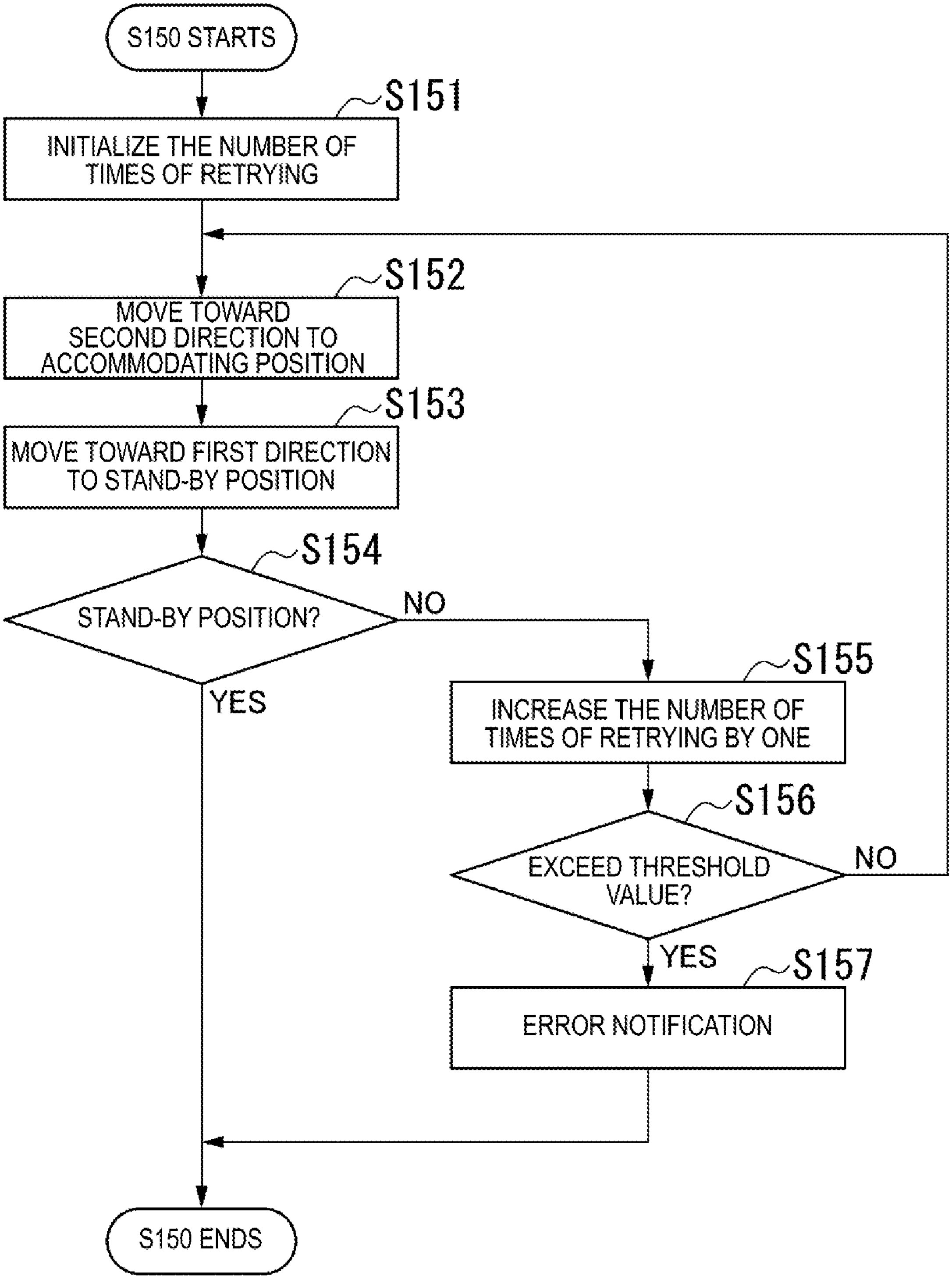
FIG. 17 is a diagram illustrating one example of a flow of a second process of step S150.

Here, FIG. 17 is a diagram illustrating one example of a flow of a second process of step S150.

The control unit 16 generates, within a storage region of the storage unit 12, a retrying-times variable that holds the number of times of retrying the processes of step S152 to step S153, which will be described later, are performed. Then, the control unit 16 initializes, to zero, the value held in the generated retrying-times variable (step S151). In FIG. 17, the process of step S151 is indicated as "Initialize the number of times of retrying". Note that the control unit 16 may have a configuration in which generation of the retrying-times variable is not performed in step S151 when the retrying-times variable is stored in the storage unit 12.

Next, the control unit 16 moves the carriage to a predetermined position, and then, controls the paper feeding motor MV to move the paper discharge tray TR toward the second direction to the accommodating position (step S152). With this configuration, the printing apparatus 1 is able to cancel the restriction of the operation unit CP by the restricting unit LM, and rotate the position of the operation unit CP from the first operation position to the second operation position. Note that, when the carriage is already disposed at the predetermined position, the control unit 16 skips the movement of the carriage in step S152.

Next, the control unit 16 controls the paper feeding motor MV to move the paper discharge tray TR toward the first direction to the stand-by position (step S153).

Next, the control unit 16 determines whether or not the position of the paper discharge tray TR is the stand-by position, on the basis of a result of detection by the second detector S2 (step S154).

When determining that the position of the paper discharge tray TR is the stand-by position (YES in step S154), the control unit 16 ends the process of the flowchart illustrated in FIG. 17, that is, ends the process of step S150 illustrated in FIG. 15.

On the other hand, when determining that the position of the paper discharge tray TR is not the stand-by position (NO in step S154), the control unit 16 increases, by one, the value of the number of times of retrying held in the retrying-times variable (step S155).

Next, the control unit 16 determines whether or not the number of times of retrying held in the retrying-times variable exceeds a predetermined threshold value (step S156). Note that the predetermined threshold value in step S156 may be a value differing from the predetermined threshold value in step S135 or may be the same value as the predetermined threshold value in step S135.

When determining that the number of times of retrying held in the retrying-times variable exceeds the predetermined threshold value (YES in step S156), the control unit 16 determines that an abnormality happens and the position of the paper discharge tray TR is not able to move to the stand-by position, and generates an image making notification of an error indicating that the position of the paper discharge tray TR is not able to move to the stand-by position. Then, the control unit 16 causes the touch panel TP to display the generated image (step S157). In FIG. 17, the process of step S157 is indicated as "Error Notification". After the process of step S157 is performed, the control unit 16 ends the process of the flowchart illustrated in FIG. 17, that is, ends the second process of step S150 illustrated in FIG. 15.

On the other hand, when determining that the number of times of retrying held in the retrying-times variable does not exceed the predetermined threshold value (NO in step S156), the control unit 16 moves to step S152, and controls the paper feeding motor MV to move the paper discharge tray TR toward the second direction to the accommodating position again.

After the process of step S150 as described above is performed, the control unit 16 ends the process of the flowchart illustrated in FIG. 15. In this manner, when the first condition is satisfied in a case where the position of the operation unit CP is the first operation position and the position of the paper discharge tray TR is not the accommodating position, the printing apparatus 1 performs the second process, which makes it possible to turn the state of the printing apparatus 1 into the first state.

On the other hand, when determining that the position of the operation unit CP is the second operation position (YES in step S110), the control unit 16 determines whether or not the position of the paper discharge tray TR is the accommodating position on the basis of a result of detection by the fourth detector S4 (step S140).

When determining that the position of the paper discharge tray TR is not the accommodating position (NO in step S140), the control unit 16 moves to step S150 to perform the second process. With this configuration, when the first condition is satisfied in a case where the position of the operation unit CP is the second operation position and the position of the paper discharge tray TR is not the accommodating position, the printing apparatus 1 performs the second process, which makes it possible to turn the state of the printing apparatus 1 into the first state.

On the other hand, when determining that the position of the paper discharge tray TR is the accommodating position (YES in step S140), the control unit 16 moves to step S130 to perform the first process. With this configuration, when the first condition is satisfied in a case where the position of the operation unit CP is the second operation position and the position of the paper discharge tray TR is the accommodating position, the printing apparatus 1 performs the first process, which makes it possible to turn the state of the printing apparatus 1 into the first state.

In this manner, when the position of the paper discharge tray TR is the accommodating position and the first condition is satisfied, the printing apparatus 1 controls the paper feeding motor MV to move the paper discharge tray TR to the stand-by position. This configuration enables the printing apparatus 1 to turn the state of the printing apparatus 1 into the first state in which a user can easily operate at timing that the user desires.

Figure 18:
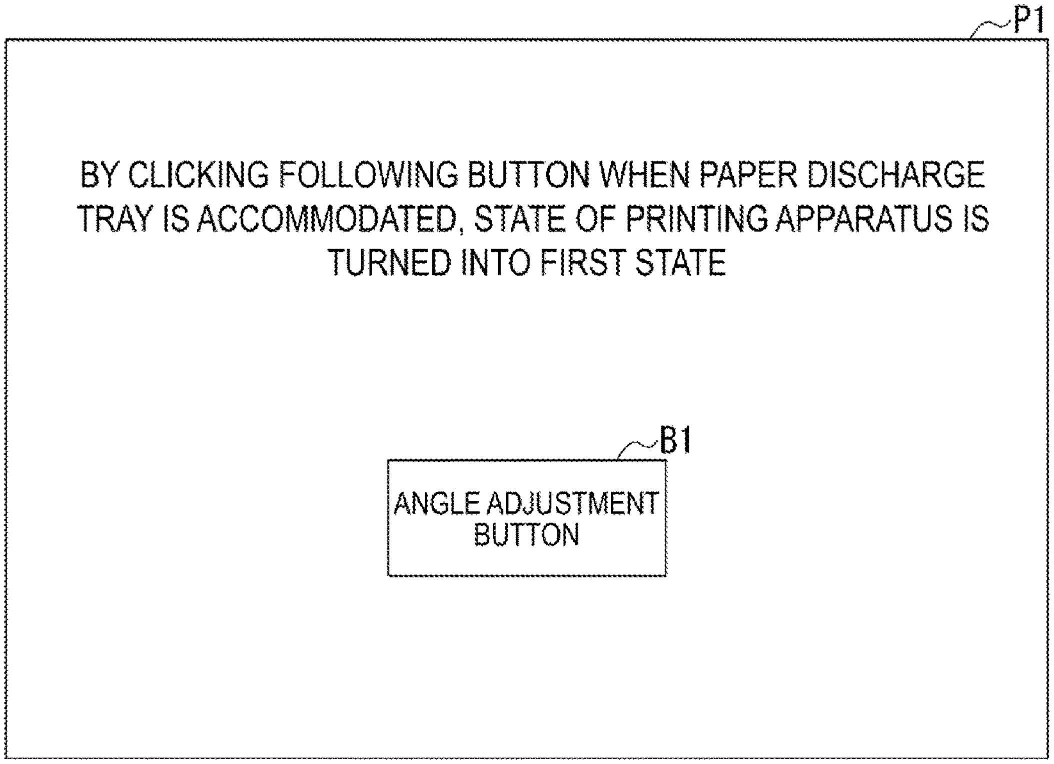
FIG. 18 is a diagram illustrating one example of an image P1 including an angle adjustment button B1.

Note that the first condition that has been described above may be, for example, a condition in which the operation unit CP receives a selecting operation performed to an angle adjustment button B1 displayed on the touch panel TP. FIG. 18 is a diagram illustrating one example of an image P1 including the angle adjustment button B1. The control unit 16 generates the image P1 in response to an operation received from a user, and causes the touch panel TP to display the generated image P1. The angle adjustment button B1 is a button used to start the process of step S110. When receiving a selecting operation performed to the angle adjustment button B1, the control unit 16 determines that the first condition is satisfied, and starts the process of step S110. This makes it possible for the user to turn, at desired timing, the state of the printing apparatus 1 into a state in which the user can easily operate. That is, in this case, the printing apparatus 1 is also able to turn the state of the printing apparatus 1 into a state in which a user can easily operate at timing that the user desires. Here, the selecting operation is, for example, a click, a tap, or the like. However, the selecting operation is not limited to these operations. Furthermore, when the selecting operation is performed to another button differing from the angle adjustment button B1, the control unit 16 may determine that the first condition is satisfied.

In addition, in the process of step S132 and the process of step S153, the control unit 16 described above may be configured so as to: control the paper feeding motor MV to start to move the paper discharge tray TR toward the first direction; then, stop moving the paper discharge tray TR when the first detector S1 detects that the position of the operation unit CP is the second operation position; and set the position at which the paper discharge tray TR stops, as the stand-by position. In other words, in this case, in the process of step S132 and the process of step S153, the stand-by position is a predetermined position at which movement of the paper discharge tray TR stops after the paper discharge tray TR starts to move. With this configuration, in the process of step S132 and the process of step S153, the printing apparatus 1 is able to more reliably rotate the position of the operation unit CP to the second operation position. This makes it possible to improve the convenience of a user.

Figure 19:
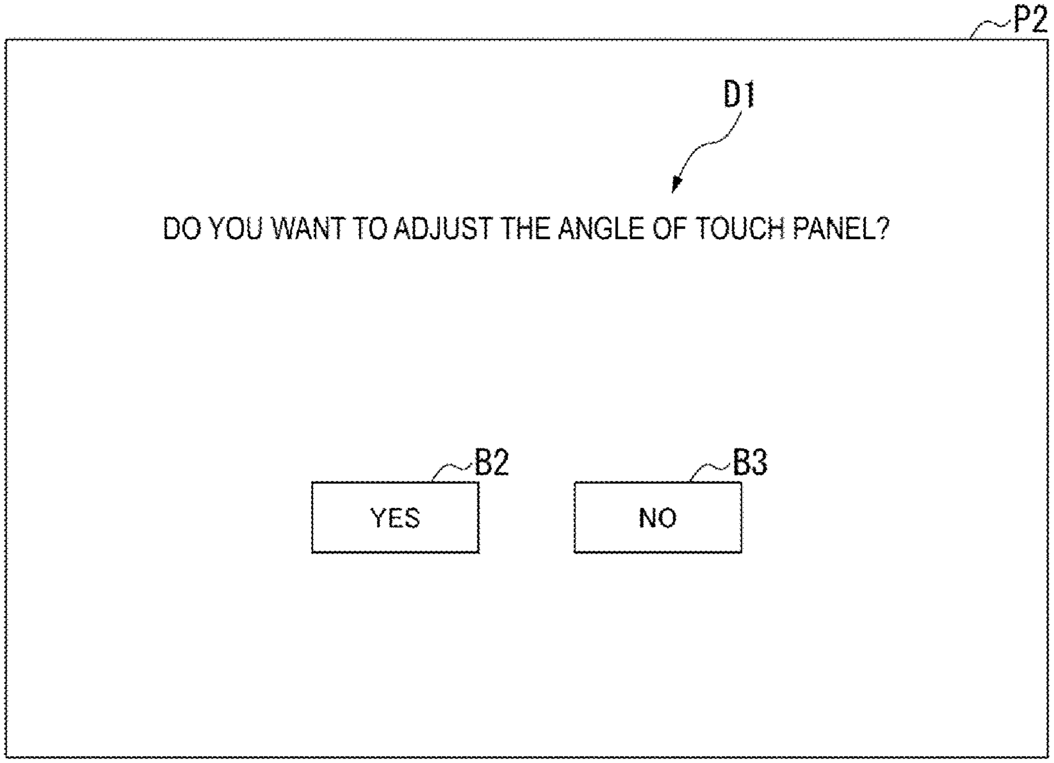
FIG. 19 is a diagram illustrating one example of an angle adjustment image P2 including information D1.

In addition, the control unit 16 described above may be configured such that, upon receiving, by the operation unit CP, a predetermined operation when the position of the operation unit CP is the first operation position and the position of the paper discharge tray TR is the accommodating position, the control unit 16 causes the touch panel TP to display the angle adjustment image P2 containing the information D1 asking whether or not to rotate the operation unit CP to the second operation position; and upon receiving, by the operation unit CP, an operation indicating that the operation unit CP is caused to rotate to the second operation position, the control unit 16 starts the process of the flowchart shown in FIG. 15. The predetermined operation may be any operation, and is, for example, an operation of tapping a given position on the touch panel TP or the like. However, the predetermined operation is not limited to this operation. FIG. 19 is a diagram illustrating one example of the angle adjustment image P2 containing the information D1. Upon receiving, by the operation unit CP, the predetermined operation in the case described above, the control unit 16 generates the angle adjustment image P2, and causes the touch panel TP to display the generated angle adjustment image P2. The angle adjustment image P2 is, for example, an image containing the information D1, a button B2, and a button B3. Note that, in FIG. 19, the information D1 is indicated as "Do you want to adjust the angle of the touch panel?" The button B2 is a button configured to receive, by the control unit 16, rotation of the operation unit CP to the second operation position. When receiving a selecting operation performed to the button B2, the control unit 16 receives rotation of the operation unit CP to the second operation position, and starts the process of the flowchart illustrated in FIG. 15. On the other hand, the button B3 is a button configured to receive, by the control unit 16, not rotating the operation unit CP to the second operation position. When receiving the selecting operation performed to the button B3, the control unit 16 receives not rotating the operation unit CP to the second operation position, and deletes the display of the angle adjustment image P2 from the touch panel TP without starting the process of the flowchart illustrated in FIG. 15. This configuration enables the printing apparatus 1 to more reliably turn the state of the printing apparatus 1 into the first state in which a user can easily operate at timing that the user desires. Note that, when the position of the paper discharge tray TR is the accommodating position and the first condition is satisfied, the control unit 16 may be configured so as to cause the angle adjustment image P2 to be displayed, and start the process of the flowchart illustrated in FIG. 15 in response to the operation that the operation unit CP receives through the angle adjustment image P2. In this case, the printing apparatus 1 is able to prevent the state of the printing apparatus 1 from turning into the first state when the user does not wish to turn the state of the printing apparatus 1 into the first state.

Modification example of a process in which the control unit turns the state of the printing apparatus into a predetermined first state.

Figure 20:
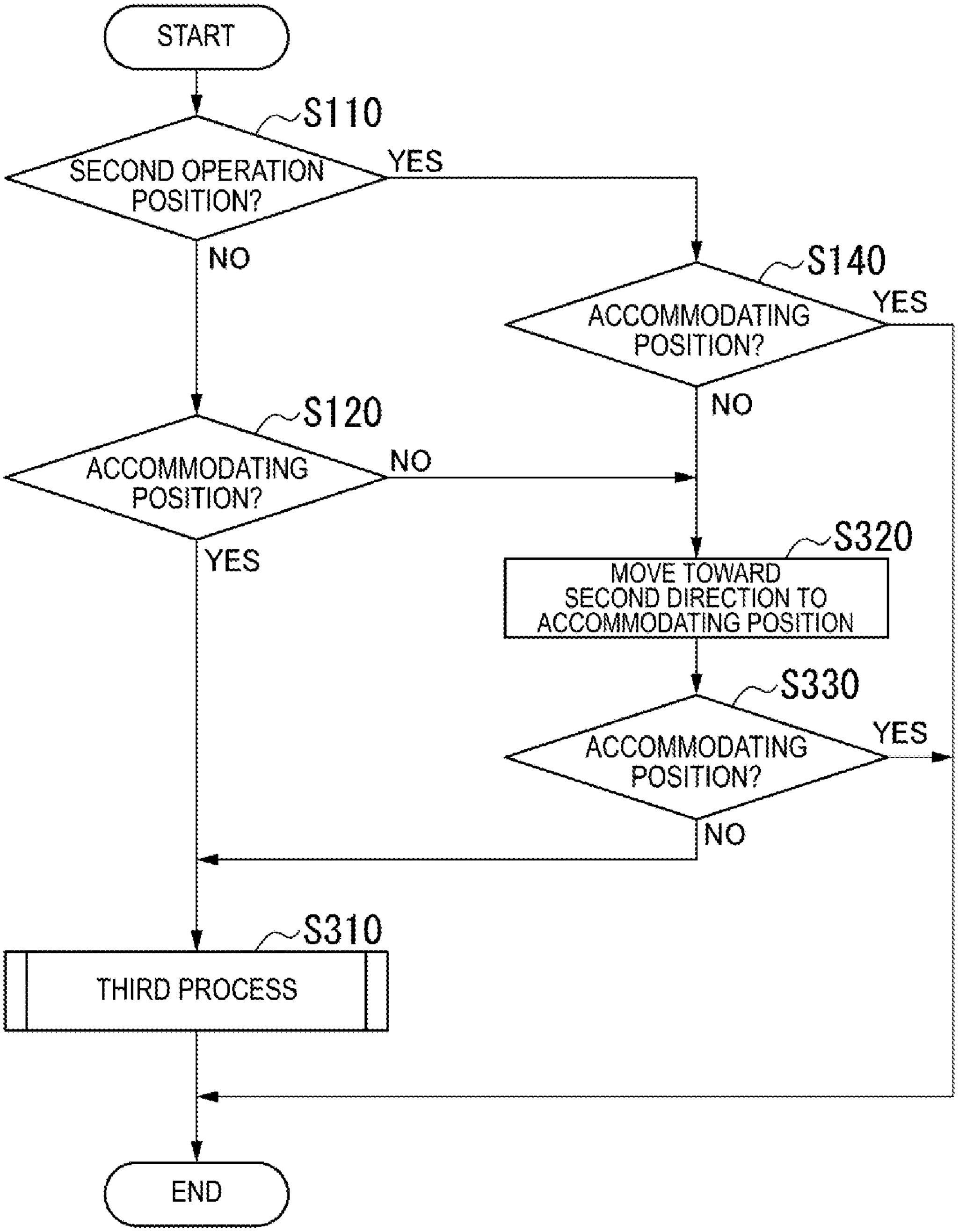
FIG. 20 is a diagram illustrating one example of a flow of a process in which the control unit 16 turns the state of the printing apparatus 1 into a predetermined second state.

The control unit 16 may be configured to turn the state of the printing apparatus 1 into the second state using a process of a flowchart illustrated in FIG. 20, instead of the configuration in which the state of the printing apparatus 1 is turned into the first state using the process of the flowchart illustrated in FIG. 15. Here, the second state represents another example of a state of the printing apparatus 1 from among states of the printing apparatus 1 in which a user is assumed to easily perform an operation. Below, description will be made of a case in which the state of the printing apparatus 1 is the second state when the operation unit CP is disposed at the second operation position and the paper discharge tray TR is disposed at the accommodating position, as one example. When the state of the printing apparatus 1 is the second state, a user easily visually recognizes the operation unit CP, and it is possible to prevent the paper discharge tray TR from coming into contact with other objects. Thus, the second state is a state in which a user is assumed to be able to easily operate, from among states of the printing apparatus 1, as described above. Thus, below, with reference to FIG. 20, description will be made of a process in which the control unit 16 turns the state of the printing apparatus 1 into the predetermined second state. Note that, in this case, when the first condition described is satisfied, the control unit 16 turns the state of the printing apparatus 1 into the second state.

FIG. 20 is a diagram illustrating one example of a flow of a process in which the control unit 16 turns the state of the printing apparatus 1 into the predetermined second state.

Below, description will be made of a case in which the first condition is satisfied at timing before the process of step S110 illustrated in FIG. 20 is performed, as one example. In addition, below, description will be made of a case in which the position of the operation unit CP is not the second operation position, and a case in which the position of the operation unit CP matches the first operation position, as one example, for the purpose of simplifying explanation. Note that the process of step S110 illustrated in FIG. 20 is a process similar to the process of step S110 illustrated in FIG. 15. In addition, the process of step S120 illustrated in FIG. 20 is a process similar to the process of step S120 illustrated in FIG. 15. In addition, the process of step S140 illustrated in FIG. 20 is a process similar to the process of step S140 illustrated in FIG. 15. Thus, in the following description, the processes of step S110, step S120, and step S140 illustrated in FIG. 20 will not be explained.

When, in step S120 illustrated in FIG. 20, determining that the position of the paper discharge tray TR is the accommodating position (YES in step S120), the control unit 16 performs a predetermined third process (step S310).

Figure 21:
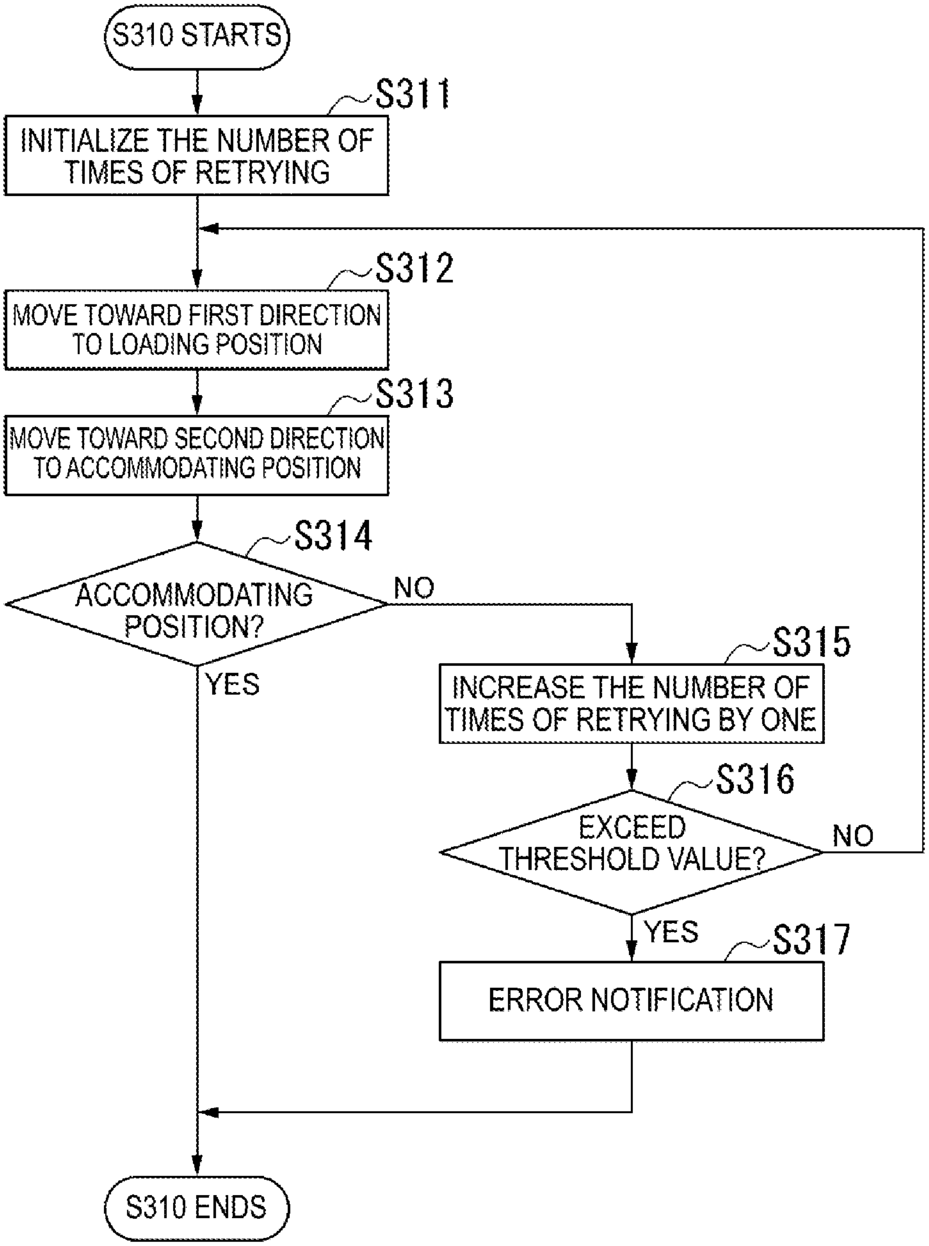
FIG. 21 is a diagram illustrating one example of a flow of a third process of step S310.

Here, FIG. 21 is a diagram illustrating one example of a flow of the third process of step S310.

The control unit 16 generates, within a storage region of the storage unit 12, a retrying-times variable that holds the number of times of retrying the processes of step S312 to step S313, which will be described later, are performed. Furthermore, the control unit 16 initializes, to zero, the value held in the generated retrying-times variable (step S311). In FIG. 21, the process of step S311 is indicated as "Initialize the number of times of retrying". Note that the control unit 16 may have a configuration in which generation of the retrying-times variable is not performed in step S311 when the retrying-times variable is stored in the storage unit 12.

Next, after causing a carriage (not illustrated) to move to a predetermined position, the control unit 16 controls the paper feeding motor MV to move the paper discharge tray TR toward the first direction to the loading position (step S312). With this configuration, the printing apparatus 1 is able to cancel the restriction of the operation unit CP by the restricting unit LM, and rotate the position of the operation unit CP from the first operation position to the second operation position. Note that, in step S312, when the carriage has already been disposed at the predetermined position, the control unit 16 skips the movement of the carriage.

Next, the control unit 16 controls the paper feeding motor MV to move the paper discharge tray TR toward the second direction to the accommodating position (step S313).

Next, the control unit 16 determines whether or not the position of the paper discharge tray TR is the accommodating position on the basis of a result of detection by the fourth detector S4 (step S314).

When determining that the position of the paper discharge tray TR is the accommodating position (YES in step S314), the control unit 16 ends the process of the flowchart illustrated in FIG. 21, that is, ends the process of step S310 illustrated in FIG. 20.

On the other hand, when determining that the position of the paper discharge tray TR is not the accommodating position (NO in step S314), the control unit 16 increases, by one, the value of the number of times of retrying held in the retrying-times variable described above (step S315).

Next, the control unit 16 determines whether or not the number of times of retrying held in the retrying-times variable exceeds a predetermined threshold value (step S316). Note that the predetermined threshold value in step S316 may be a value differing from at least one of the predetermined threshold value in step S135 and the predetermined threshold value in step S156, or may be the same value as at least one of the predetermined threshold value in step S135 and the predetermined threshold value in step S156.

When determining that the number of times of retrying held in the retrying-times variable exceeds the predetermined threshold value (YES in step S316), the control unit 16 determines that an abnormality happens and the position of the paper discharge tray TR is not able to move to the stand-by position, and generates an image making notification of an error indicating that the position of the paper discharge tray TR is not able to move to the accommodating position. Then, the control unit 16 causes the touch panel TP to display the generated image (step S317). In FIG. 21, the process of step S317 is indicated as "Error Notification". After the process of step S317 is performed, the control unit 16 ends the process of the flowchart illustrated in FIG. 21, that is, ends the third process of step S310 illustrated in FIG. 20.

On the other hand, when determining that the number of times of retrying held in the retrying-times variable does not exceed the predetermined threshold value (NO in step S316), the control unit 16 moves to step S312, and controls the paper feeding motor MV to move the paper discharge tray TR toward the first direction to the loading position again.

After the process of step S310 as described above is performed, the control unit 16 ends the process of the flowchart illustrated in FIG. 20. In this manner, when the first condition is satisfied in a case where the position of the operation unit CP is the first operation position and the position of the paper discharge tray TR is the accommodating position, the printing apparatus 1 performs the third process, which makes it possible to turn the state of the printing apparatus 1 into the second state.

On the other hand, when determining in step S120 illustrated in FIG. 20 that the position of the paper discharge tray TR is not the accommodating position (NO in step S120), the control unit 16 causes the carriage (not illustrated) to move to a predetermined position, and controls the paper feeding motor MV to move the paper discharge tray TR toward the second direction to the accommodating position (step S320).

Next, the control unit 16 determines whether or not the position of the paper discharge tray TR is the accommodating position on the basis of a result of detection by the fourth detector S4 (step S330).

When determining that the position of the paper discharge tray TR is the accommodating position (YES in step S330), the control unit 16 ends the process of the flowchart illustrated in FIG. 20.

When determining that the position of the paper discharge tray TR is not the accommodating position (NO in step S330), the control unit 16 moves to step S310 to perform the third process described above.

In this manner, when the position of the paper discharge tray TR is the accommodating position and the predetermined first condition is satisfied, the printing apparatus 1 controls the paper feeding motor MV to move the paper discharge tray TR to the loading position, and then, move the paper discharge tray TR to the accommodating position. This configuration enables the printing apparatus 1 to turn the state of the printing apparatus 1 into the second state in which a user can easily operate at timing that the user desires.

Figure 22:
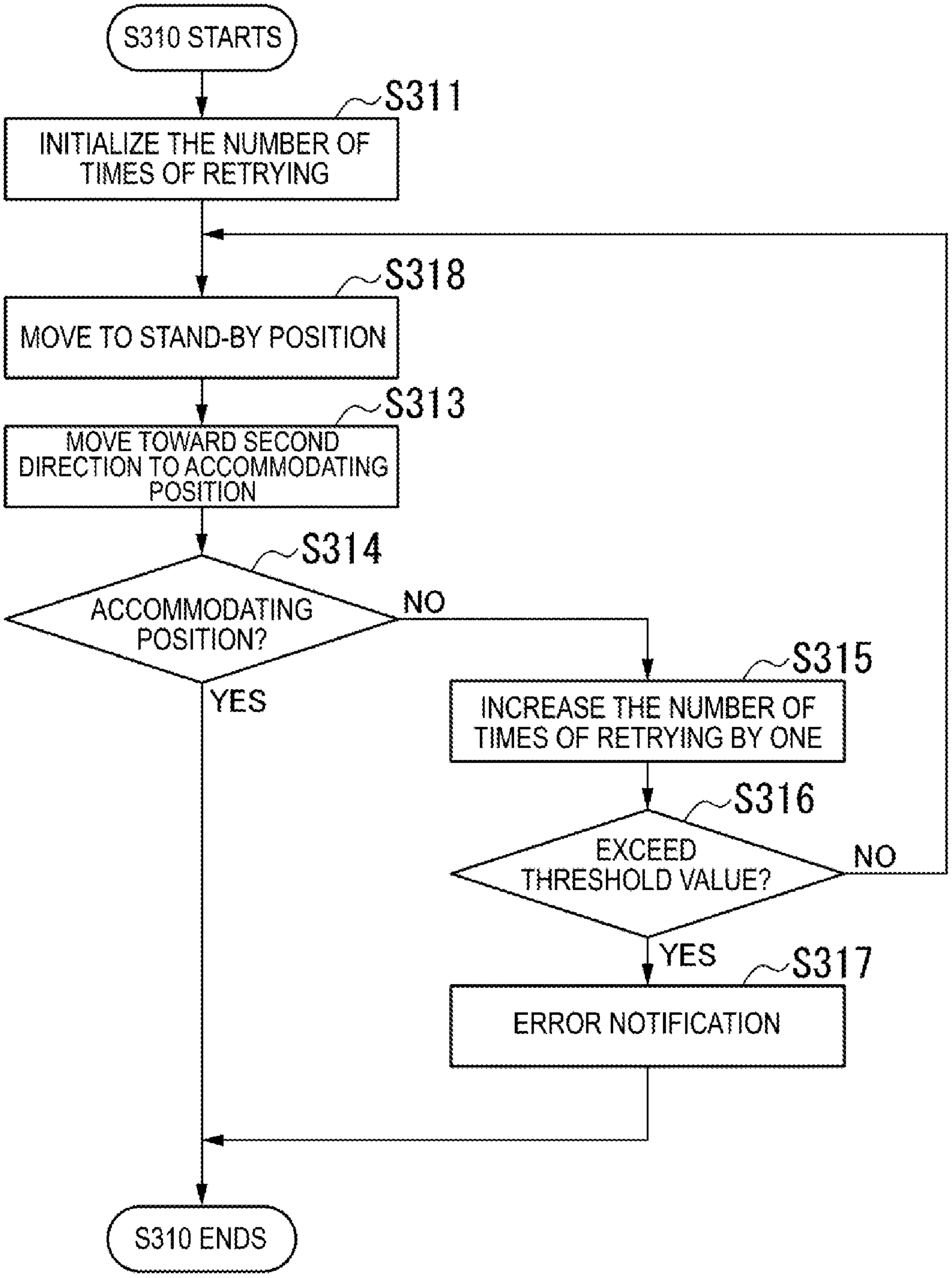
FIG. 22 is a diagram illustrating another example of a flow of the third process.

Note that the control unit 16 may be configured to perform a process of a flowchart illustrated in FIG. 22 as the third process of step S310, instead of the process of the flowchart illustrated in FIG. 21. FIG. 22 is a diagram illustrating another example of a flow of the third process. Note that the process of step S311 illustrated in FIG. 22 is a process similar to the process of step S311 illustrated in FIG. 21. In addition, the processes of step S313 to step S317 illustrated in FIG. 22 are processes similar to the processes of step S313 to step S317 illustrated in FIG. 21. Thus, below, description will not be made of the processes of step S311 and steps S313 to S317 illustrated in FIG. 21.

After the process of step S311 illustrated in FIG. 22 is performed, the control unit 16 causes the carriage (not illustrated) to move to a predetermined position, and then, controls the paper feeding motor MV to move the paper discharge tray TR toward the first direction to the stand-by position (step S318). This configuration enables the printing apparatus 1 to reduce the distance at which the paper discharge tray TR moves in the third process, which makes it possible to improve the convenience of a user.

Process in which the control unit causes the paper discharge tray to move when a printing instruction is received.

Figure 23:
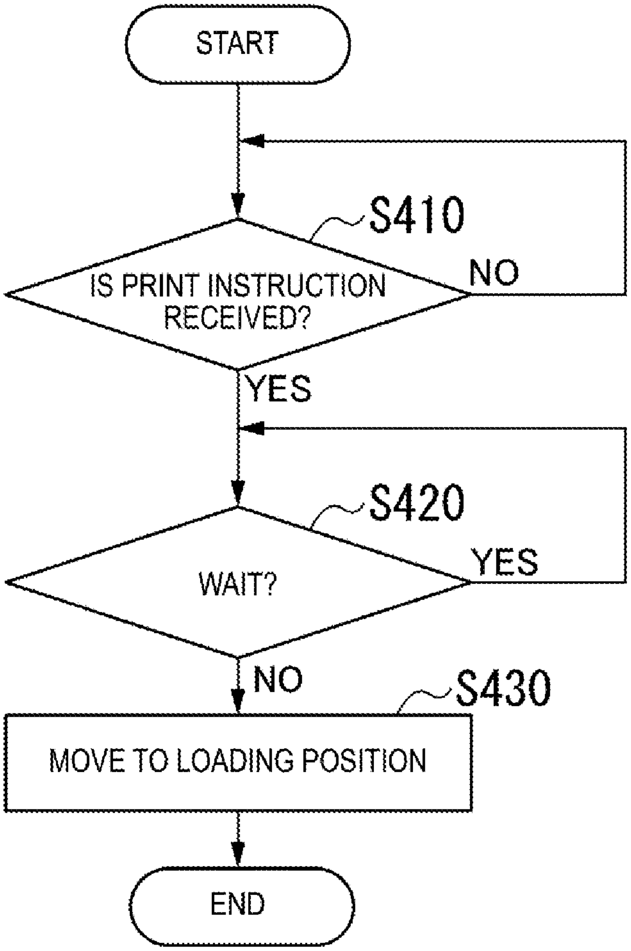
FIG. 23 is a diagram illustrating one example of a flow of a process in which the control unit 16 moves the paper discharge tray TR when a printing instruction is received.

Here, when receiving a printing instruction, the control unit 16 causes the paper discharge tray TR to move to the loading position. Specifically, for example, when the first condition is not satisfied and an instruction to perform printing using the printing unit PR is received, the control unit 16 controls the paper feeding motor MV to move the paper discharge tray TR to the loading position. In addition, the control unit 16 controls the paper feeding motor MV to move the paper discharge tray TR to the loading position, for example, when receiving the printing instruction before the paper discharge tray TR starts to be moved from the accommodating position to the stand-by position in the process of the flowchart illustrated in FIG. 15, or when receiving the printing instruction before the paper discharge tray TR starts to be moved from the accommodating position to the loading position in the process of the flowchart illustrated in FIG. 20. Thus, below, with reference to FIG. 23, description will be made of a process in which the control unit 16 causes the paper discharge tray TR to move when receiving the printing instruction. FIG. 23 is a diagram illustrating one example of a flow of a process in which the control unit 16 causes the paper discharge tray TR to move when receiving the printing instruction.

The control unit 16 waits until the printing instruction is received (step S410).

When determining that the printing instruction is received (YES in step S410), the control unit 16 determines whether or not to wait until other processes that are currently being performed end (step S420). For example, when at least one of one or more predetermined processes is currently being performed, the control unit 16 determines in step S420 that the control unit 16 waits until other processes that are currently being performed end. On the other hand, for example, when none of the one or more processes is currently being performed, the control unit 16 determines in step S420 that the control unit 16 does not wait until these other processes that are currently being performed end. Here, the one or more processes include, for example, a process before movement of the paper discharge tray TR from the accommodating position to the stand-by position starts, from among the process of the flowchart illustrated in FIG. 15, a process before movement of the paper discharge tray TR from the accommodating position to the loading position starts, from among the process of the flowchart illustrated in FIG. 20, or the like. However, the one or more processes are not limited to these.

When it is determined that the control unit 16 waits until the other processes that are currently being performed end (YES in step S420), the control unit 16 waits until the other processes that are currently being performed end, and then, moves to step S430.

On the other hand, when it is not determined that the control unit 16 waits until the other processes that are currently being performed end (NO in step S420), the control unit 16 move the carriage (not illustrated) to a predetermined position, and then, controls the paper feeding motor MV to move the paper discharge tray TR toward the first direction to the loading position (step S430). This configuration enables the printing apparatus 1 to improve the throughput of printing, which makes it possible to improve the convenience of a user. Note that, in this case and when the control unit 16 determines that the paper discharge tray TR is disposed at the loading position on the basis of a result of detection by the third detector S3, the control unit 16 skips the process of step S430. In addition, in step S312, when the carriage has already been disposed at the predetermined position, the control unit 16 skips the movement of the carriage. After the process of step S430 is performed, the control unit 16 ends the process of the flowchart illustrated in step FIG. 23.

In this manner, when the first condition is not satisfied and an instruction to perform printing using the printing unit PR is received, the printing apparatus 1 controls the paper feeding motor MV to move the paper discharge tray TR to the loading position. In addition, the printing apparatus 1 controls the paper feeding motor MV to move the paper discharge tray TR to the loading position, when receiving the printing instruction before the paper discharge tray TR starts to be moved from the accommodating position to the stand-by position in the process of the flowchart illustrated in FIG. 15, or when receiving the printing instruction before the paper discharge tray TR starts to be moved from the accommodating position to the loading position in the process of the flowchart illustrated in FIG. 20. This configuration enables the printing apparatus 1 to improve the throughput of printing, which makes it possible to improve the convenience of a user. In addition, the printing apparatus 1 performs the process of the flowchart illustrated in FIG. 23. Thus, when receiving the printing instruction in a case where the paper discharge tray TR is disposed at the accommodating position, the printing apparatus 1 allows a user to easily perform an operation after printing is performed.

Note that, instead of the process of determining whether or not the printing instruction is received, the process of step S410 illustrated in FIG. 23 may be a process of determining whether or not another condition is satisfied. Here, the other condition described above may be, for example, a condition in which the original-document stage of the scanner is opened or the like. However, the other condition is not limited to this.

Furthermore, the printing apparatus 1 described above may be configured so as to allow a user to select whether or not to perform the process of the flowchart illustrated in FIG. 15 or FIG. 20 when the first condition is satisfied.

In addition, the printing apparatus 1 described above may be configured such that no first detector S1 is provided. In this case, for example, the printing apparatus 1 determines whether or not the position of the operation unit CP is the first operation position on the basis of the position of the paper discharge tray TR.

In addition, when receiving an operation of turning off the power of the printing apparatus 1 and the paper discharge tray TR is not disposed at the accommodating position, the printing apparatus 1 described above may be configured to cause the touch panel TP to display an image used to receive an operation indicating whether or not to cause the paper discharge tray TR to be accommodated. In this case, upon receiving, through the image, an operation indicating that the paper discharge tray TR is to be accommodated, the printing apparatus 1 causes the carriage to move to a predetermined position, and then, controls the paper feeding motor MV to move the paper discharge tray TR toward the second direction to the accommodating position. Subsequently, the printing apparatus 1 turns off the power of the printing apparatus 1. Note that, upon receiving an operation for turning off the power of the printing apparatus 1 when the paper discharge tray TR is disposed at the accommodating position, the printing apparatus 1 turns off the power of the printing apparatus 1 without moving the paper discharge tray TR.

Furthermore, the printing apparatus 1 may have a configuration in which, when the first condition is satisfied, the operation unit CP is rotated from the first operation position to a position designated by a user from among two or more positions, instead of the configuration in which the position of the operation unit CP is rotated from the first operation position to the second operation position.

In addition, the printing apparatus 1 may be configured so as to determine whether or not the paper discharge tray TR is disposed at the accommodating position, on the basis of a result of detection made by a combination of two or more of the second detector S2 to the fourth detector S4.

Furthermore, the matters described above may be combined in any manner.

As described above, the printing apparatus 1 according to the embodiment provides a printing apparatus including: the printing unit PR configured to print an image on a printing medium; the operation unit CP configured to receive an operation and rotate about the rotation axis to the first operation position and the second operation position, the first operation position being a position at which the operation unit is inclined at the predetermined first angle relative to an installation surface where the printing apparatus 1 is disposed, the second operation position being a position at which the operation unit is inclined at the second angle smaller than the first angle relative to the installation surface; the paper discharge tray TR provided lower than the rotation axis AX1 in a height direction, the height direction being a direction perpendicular to the installation surface and directed from the installation surface toward the printing apparatus 1, the paper discharge tray being configured to move in a front-rear direction toward the first direction intersecting the height direction; the paper feeding motor MV configured to move the paper discharge tray TR; the rotating mechanism RT configured to cause the operation unit CP to rotate from the first operation position to the second operation position in association with movement of the paper discharge tray TR; and the control unit 16 configured to control the printing unit PR, the operation unit CP, and the paper feeding motor MV, in which the paper discharge tray TR is configured to move to the accommodating position, the loading position, and the predetermined stand-by position, the accommodating position being a position at which the paper discharge tray TR is accommodated in a housing of the printing apparatus 1, the loading position being a position at which the paper discharge tray receives the discharged printing medium, the predetermined stand-by position being a position disposed closer to the accommodating position than the loading position, when the position of the operation unit CP is the first operation position and the paper discharge tray TR moves between the accommodating position and the stand-by position, the rotating mechanism RT causes the operation unit CP to rotate from the first operation position to the second operation position, and when the position of the paper discharge tray TR is the accommodating position and the predetermined first condition is satisfied, the control unit 16 controls the paper feeding motor MV to move the paper discharge tray TR to the stand-by position. This configuration enables the printing apparatus 1 to turn the state of the printing apparatus 1 into the state in which a user can easily operate at timing that the user desires.

Supplementary Description

[1]

A printing apparatus including: a printing unit configured to print an image on a printing medium; an operation unit configured to receive an operation and rotate about a rotation axis to a first operation position and a second operation position, the first operation position being a position at which the operation unit is inclined at a predetermined first angle relative to an installation surface where the printing apparatus is disposed, the second operation position being a position at which the operation unit is inclined at a second angle smaller than the first angle relative to the installation surface; a paper discharge tray provided lower than the rotation axis in a height direction, the height direction being a direction perpendicular to the installation surface and directed from the installation surface toward the printing apparatus, the paper discharge tray being configured to move in a front-rear direction toward a first direction intersecting the height direction; a movement unit configured to move the paper discharge tray; a rotating mechanism configured to cause the operation unit to rotate from the first operation position to the second operation position in association with movement of the paper discharge tray; and a control unit configured to control the printing unit, the operation unit, and the movement unit, in which the paper discharge tray is configured to move to an accommodating position, a loading position, and a predetermined stand-by position, the accommodating position being a position at which the paper discharge tray is accommodated in a housing of the printing apparatus, the loading position being a position at which the paper discharge tray receives the discharged printing medium, the predetermined stand-by position being a position disposed closer to the accommodating position than the loading position, when a position of the operation unit is the first operation position and the paper discharge tray moves between the accommodating position and the stand-by position, the rotating mechanism causes the operation unit to rotate from the first operation position to the second operation position, and when a position of the paper discharge tray is the accommodating position and a predetermined first condition is satisfied, the control unit controls the movement unit to perform first control in which the paper discharge tray is moved to the stand-by position.

[2]

The printing apparatus according to [1], further including: a restricting unit configured to restrict rotation of the operation unit from the first operation position to the second operation position, in which the restricting unit uses the stand-by position or a position between the stand-by position and the accommodating position as a restriction canceling position, and when the position of the paper discharge tray matches the restriction canceling position in a case where the restricting unit restricts rotation of the operation unit at the first operation position, the restricting unit cancels the restriction of the rotation of the operation unit from the first operation position to the second operation position.

[3]

The printing apparatus according to [1] or [2], in which the first control is control in which, after the paper discharge tray is moved to the stand-by position, the paper discharge tray is moved to the accommodating position.

[4]

The printing apparatus according to any one of [1] to [3], in which, when the first condition is not satisfied and an instruction to perform printing using the printing unit is received, the control unit controls the movement unit to perform second control in which the paper discharge tray is moved to the loading position.

[5]

The printing apparatus according to any one of [1] to [4], in which the first condition is turning on the printing apparatus.

[6]

The printing apparatus according to any one of [1] to [5], in which the operation unit includes a touch panel, and the first condition is a condition in which the operation unit receives a selecting operation performed to an angle adjustment button displayed at the touch panel.

[7]

The printing apparatus according to any one of [1] to [6], further including a first detector configured to detect whether or not the position of the operation unit is the second operation position, in which, when the first condition is satisfied, the control unit controls the movement unit in the first control to start to move the paper discharge tray toward the first direction, subsequently, when the first detector detects that the position of the operation unit is the second operation position, the control unit stops moving the paper discharge tray, and the stand-by position is a predetermined position serving as a position at which, in the first control, after the paper discharge tray starts to move, the paper discharge tray stops moving.

[8]

The printing apparatus according to any one of [1] to [7], in which, of end portions of the paper discharge tray disposed at the stand-by position, an end portion at a side of the first direction is disposed more toward a direction opposite from the first direction than an end portion, at the side of the first direction, of the operation unit from among end portions of the operation unit disposed at the second operation position.

[9]

The printing apparatus according to any one of [1] to [8], further including: an accommodating unit configured to move in a front-rear direction toward the first direction and accommodate the printing medium, in which, of end portions of the paper discharge tray disposed at the stand-by position, an end portion at a side of the first direction is disposed more toward a direction opposite from the first direction than an end portion, at the side of the first direction, of the accommodating unit from among end portions of the accommodating unit.

[10]

The printing apparatus according to [1], further including: a first detector configured to detect whether or not the position of the operation unit is the second operation position; a second detector configured to detect whether or not the position of the paper discharge tray is the stand-by position; and a third detector configured to detect whether or not the position of the paper discharge tray is the loading position, in which, when the first condition is satisfied in a case where the position of the operation unit is determined to be the second operation position on a basis of a result of detection by the first detector and the position of the paper discharge tray is not determined to be the accommodating position on a basis of a result of detection by the second detector or the third detector, the control unit performs third control in which the paper discharge tray is moved to the accommodating position and then is moved to the stand-by position.

[11]

The printing apparatus according to any one of [1] to [10], further including: a first detector configured to detect whether or not the position of the operation unit is the second operation position; and a fourth detector configured to detect whether or not the position of the paper discharge tray is the accommodating position, in which, when the first condition is satisfied in a case where the position of the operation unit is determined to be the first operation position on a basis of a result of detection by the first detector and the position of the paper discharge tray is not determined to be the accommodating position on a basis of a result of detection by the fourth detector, the control unit performs fourth control in which the paper discharge tray is moved to the accommodating position and then is moved to the stand-by position.

[12]

The printing apparatus according to any one of [1] to [11], in which, in the first control, when receiving a printing instruction before starting to move the paper discharge tray from the accommodating position to the stand-by position, the control unit moves the paper discharge tray to the loading

[13]

The printing apparatus according to any one of [1] to [12], in which the first condition is a condition in which a medium detector detects an original document placed on a mounting platform of an auto document feeder (ADF).

[14]

The printing apparatus according to any one of [1] to [13], further including: an original-document stage on which an original document to be read is placed; and a reading unit configured to detect whether or not the original document is placed on the original-document stage and read image information indicating an image on the original document placed on the original-document stage, in which the first condition is a condition in which the reading unit detects that the original document is placed on the original-document stage.

[15]

The printing apparatus any one of [1] to [14], in which the operation unit includes a touch panel, upon receiving, by the operation unit, an operation when the position of the operation unit is the first operation position and the position of the paper discharge tray is the accommodating position, the control unit causes the touch panel to display information asking whether or not to rotate the operation unit to the second operation position, and when the operation unit receives operation instructing the operation unit to rotate to the second operation position, the control unit performs the first control.

[16]

The printing apparatus according to any one of [1] to [15], in which the operation unit disposed at the first operation position overlaps, in the first direction, with the paper discharge tray disposed at the stand-by position.

[17]

The printing apparatus according to any one of [1] to [16], further including: a rack toothed gear provided at the paper discharge tray; a cam-equipped toothed gear configured to be engaged with the rack toothed gear; and a lever member configured to be engaged with a cam unit of the cam-equipped toothed gear, in which, with rotation of the cam-equipped toothed gear rotated by the rack toothed gear in association with movement of the paper discharge tray, a pressing unit of the lever member moves the operation unit from the first operation position to the second operation position.

[18]

The printing apparatus according to any one of [1] to [17], in which the operation unit includes a touch panel, when the position of the paper discharge tray is the accommodating position and the first condition is satisfied, the control unit causes the touch panel to display an angle adjustment image containing information asking whether or not to rotate the operation unit to the second operation position, and the control unit performs the first control in response to an operation that the operation unit receives through the angle adjustment image.

[19]

A printing apparatus including: a printing unit configured to print an image on a printing medium; an operation unit configured to receive an operation and rotate about a rotation axis to a first operation position and a second operation position, the first operation position being a position at which the operation unit is inclined at a predetermined first angle relative to an installation surface where the printing apparatus is disposed, the second operation position being a position at which the operation unit is inclined at a second angle smaller than the first angle relative to the installation surface; a paper discharge tray provided lower than the rotation axis in a height direction, the height direction being a direction perpendicular to the installation surface and directed from the installation surface toward the printing apparatus, the paper discharge tray being configured to move in a front-rear direction toward a first direction intersecting the height direction; a movement unit configured to move the paper discharge tray; a rotating mechanism configured to cause the operation unit to rotate from the first operation position to the second operation position in association with movement of the paper discharge tray; and a control unit configured to control the printing unit, the operation unit, and the movement unit, in which the paper discharge tray is configured to move to an accommodating position and a loading position, the accommodating position being a position at which the paper discharge tray is accommodated in a housing of the printing apparatus, the loading position being a position at which the paper discharge tray receives the discharged printing medium, when a position of the operation unit is the first operation position and the paper discharge tray moves between the accommodating position and the loading position, the rotating mechanism causes the operation unit to rotate from the first operation position to the second operation position, and when a position of the paper discharge tray is the accommodating position and a predetermined first condition is satisfied, the control unit controls the movement unit to perform third control in which the paper discharge tray is moved to the loading position and then, the paper discharge tray is moved to the accommodating position.

[20]

A method of controlling a printing apparatus, the printing apparatus including: a printing unit configured to print an image on a printing medium; an operation unit configured to receive an operation and rotate about a rotation axis to a first operation position and a second operation position, the first operation position being a position at which the operation unit is inclined at a predetermined first angle relative to an installation surface where the printing apparatus is disposed, the second operation position being a position at which the operation unit is inclined at a second angle smaller than the first angle relative to the installation surface; a paper discharge tray provided lower than the rotation axis in a height direction, the height direction being a direction perpendicular to the installation surface and directed from the installation surface toward the printing apparatus, the paper discharge tray being configured to move in a front-rear direction toward a first direction intersecting the height direction; a movement unit configured to move the paper discharge tray; and a rotating mechanism configured to cause the operation unit to rotate from the first operation position to the second operation position in association with movement of the paper discharge tray, in which the paper discharge tray is configured to move to an accommodating position, a loading position, and a predetermined stand-by position, the accommodating position being a position at which the paper discharge tray is accommodated in a housing of the printing apparatus, the loading position being a position at which the paper discharge tray receives the discharged printing medium, the predetermined stand-by position being a position disposed closer to the accommodating position than the loading position, when a position of the operation unit is the first operation position and the paper discharge tray moves between the accommodating position and the stand-by position, the rotating mechanism causes the operation unit to rotate from the first operation position to the second operation position, and when a position of the paper discharge tray is the accommodating position and a predetermined first condition is satisfied, the method of controlling includes controlling the movement unit to perform a first control step in which the paper discharge tray is moved to the stand-by position.

These are detailed description of the embodiment according to the present disclosure with reference to the drawings. However, specific configurations are not limited to this embodiment, and may be modified, replaced, deleted, or the like, provided that these do not depart from the main point of the present disclosure.

In addition, a program for achieving the functions of any constituent units of the device described above may be recorded in a computer-readable recording medium, and the program may be read and executed by a computer system. Here, this device is, for example, the printing apparatus 1 or the like. Note that the "computer system" as used here is assumed to include hardware such as an operating system (OS) or a peripheral apparatus. In addition, the "computer-readable recording medium" represents a portable medium such as a flexible disk, a magneto-optical disk, a ROM, a compact disc (CD)-ROM, and a storage device such as a hard disk built into a computer system. Furthermore, the "computer-readable recording medium" is assumed to include a medium that holds a program for a certain period of time, which includes a volatile memory provided inside of a computer system serving as a server or a client when the program is transmitted via a network such as the Internet or a communication line such as a telephone line.

In addition, the program described above may be transmitted via a transmission medium from a computer system storing the program in a storage device or the like, or to another computer system using transmission waves in a transmission medium. Here, the "transmission medium" used to transmit a program represents a medium having a function of transmitting information, as with a network such as the Internet or a communication line such as a telephone line.

In addition, the program described above may be a program used to achieve a portion of the functions described above. Furthermore, the program described above can be a so-called differential file or a differential program that can achieve the functions described above in combination with a program that has already been recorded in the computer system.

What is claimed is:

1. A printing apparatus comprising:

a printing unit configured to print an image on a printing medium;

an operation unit configured to receive an operation and rotate about a rotation axis to a first operation position and a second operation position, the first operation position being a position at which the operation unit is inclined at a predetermined first angle relative to an installation surface where the printing apparatus is disposed, the second operation position being a position at which the operation unit is inclined at a second angle smaller than the first angle relative to the installation surface;

a paper discharge tray provided lower than the rotation axis in a height direction, the height direction being a direction perpendicular to the installation surface and directed from the installation surface toward the printing apparatus, the paper discharge tray being configured to move in a front-rear direction toward a first direction intersecting the height direction;

a movement unit configured to move the paper discharge tray;

a rotating mechanism configured to cause the operation unit to rotate from the first operation position to the second operation position in association with movement of the paper discharge tray; and a control unit configured to control the printing unit, the operation unit, and the movement unit, wherein the paper discharge tray is configured to move to an accommodating position, a loading position, and a predetermined stand-by position, the accommodating position being a position at which the paper discharge tray is accommodated in a housing of the printing apparatus, the loading position being a position at which the paper discharge tray receives the discharged printing medium, the predetermined stand-by position being a position disposed closer to the accommodating position than the loading position, when a position of the operation unit is the first operation position and the paper discharge tray moves between the accommodating position and the stand-by position, the rotating mechanism causes the operation unit to rotate from the first operation position to the second operation position, and when a position of the paper discharge tray is the accommodating position and a predetermined first condition is satisfied, the control unit controls the movement unit to perform first control in which the paper discharge tray is moved to the stand-by position.

2. The printing apparatus according to claim 1, further comprising:

a restricting unit configured to restrict rotation of the operation unit from the first operation position to the second operation position, wherein the restricting unit uses the stand-by position or a position between the stand-by position and the accommodating position as a restriction canceling position, and when the position of the paper discharge tray matches the restriction canceling position in a case where the restricting unit restricts rotation of the operation unit at the first operation position, the restricting unit cancels the restriction of the rotation of the operation unit from the first operation position to the second operation position.

3. The printing apparatus according to claim 1, wherein the first control is control in which, after the paper discharge tray is moved to the stand-by position, the paper discharge tray is moved to the accommodating position.

4. The printing apparatus according to claim 1, wherein, when the first condition is not satisfied and an instruction to perform printing using the printing unit is received, the control unit controls the movement unit to perform second control in which the paper discharge tray is moved to the loading position.

5. The printing apparatus according to claim 1, wherein the first condition includes turning on the printing apparatus.

6. The printing apparatus according to claim 1, wherein the operation unit includes a touch panel, and the first condition includes the operation unit receiving selecting operation performed on an angle adjustment button displayed at the touch panel.

7. The printing apparatus according to claim 1, further comprising:

a first detector configured to detect whether or not the position of the operation unit is the second operation position, wherein when the first condition is satisfied, the control unit controls the movement unit in the first control to start to move the paper discharge tray toward the first direction, subsequently, when the first detector detects that the position of the operation unit is the second operation position, the control unit stops moving the paper discharge tray, and the stand-by position is a predetermined position serving as a position at which, in the first control, after the paper discharge tray starts to move, the paper discharge tray stops moving.

8. The printing apparatus according to claim 1, wherein of end portions of the paper discharge tray disposed at the stand-by position, an end portion at a side of the first direction is disposed more toward a direction opposite from the first direction than an end portion, at the side of the first direction, of the operation unit from among end portions of the operation unit disposed at the second operation position.

9. The printing apparatus according to claim 1, further comprising:

an accommodating unit configured to move in a front-rear direction toward the first direction and accommodate the printing medium, wherein of end portions of the paper discharge tray disposed at the stand-by position, an end portion at a side of the first direction is disposed more toward a direction opposite from the first direction than an end portion, at the side of the first direction, of the accommodating unit from among end portions of the accommodating unit.

10. The printing apparatus according to claim 1, further comprising:

a first detector configured to detect whether or not the position of the operation unit is the second operation position;

a second detector configured to detect whether or not the position of the paper discharge tray is the stand-by position; and a third detector configured to detect whether or not the position of the paper discharge tray is the loading position, wherein, when the first condition is satisfied in a case where the position of the operation unit is determined to be the second operation position on a basis of a result of detection by the first detector and the position of the paper discharge tray is not determined to be the accommodating position on a basis of a result of detection by the second detector or the third detector, the control unit performs third control in which the paper discharge tray is moved to the accommodating position and then is moved to the stand-by position.

11. The printing apparatus according to claim 1, further comprising:

a first detector configured to detect whether or not the position of the operation unit is the second operation position; and a fourth detector configured to detect whether or not the position of the paper discharge tray is the accommodating position, wherein, when the first condition is satisfied in a case where the position of the operation unit is determined to be the first operation position on a basis of a result of detection by the first detector and the position of the paper discharge tray is not determined to be the accommodating position on a basis of a result of detection by the fourth detector, the control unit performs fourth control in which the paper discharge tray is moved to the accommodating position and then is moved to the stand-by position.

12. The printing apparatus according to claim 1, wherein, in the first control, when receiving a printing instruction before starting to move the paper discharge tray from the accommodating position to the stand-by position, the control unit moves the paper discharge tray to the loading position.

13. The printing apparatus according to claim 1, wherein the first condition includes detection by a medium detector of an original document placed on a mounting platform of an auto document feeder or ADF.

14. The printing apparatus according to claim 1, further comprising:

an original-document stage at which an original document to be read is placed; and a reading unit configured to detect whether or not the original document is placed at the original-document stage and read image information indicating an image on the original document placed on the original-document stage, wherein the first condition includes detection by the reading unit of the original document placed on the original-document stage.

15. The printing apparatus according to claim 1, wherein the operation unit includes a touch panel, and in a case where the position of the operation unit is the first operation position and the position of the paper discharge tray is the accommodating position, when the operation unit receives an operation, the control unit causes the touch panel to display information asking whether or not to rotate the operation unit to the second operation position, and when the operation unit receives operation instructing the operation unit to rotate to the second operation position, the control unit performs the first control.

16. The printing apparatus according to claim 1, wherein the operation unit disposed at the first operation position overlaps, in the first direction, with the paper discharge tray disposed at the stand-by position.

17. The printing apparatus according to claim 1, wherein the rotating mechanism includes:

a rack toothed gear provided at the paper discharge tray;

a cam-equipped toothed gear configured to be engaged with the rack toothed gear; and a lever member configured to be engaged with a cam unit of the cam-equipped toothed gear, wherein, with rotation of the cam-equipped toothed gear rotated by the rack toothed gear in association with movement of the paper discharge tray, a pressing unit of the lever member moves the operation unit from the first operation position to the second operation position.

18. The printing apparatus according to claim 1, wherein the operation unit includes a touch panel, when the position of the paper discharge tray is the accommodating position and the first condition is satisfied, the control unit causes the touch panel to display an angle adjustment image containing information asking whether or not to rotate the operation unit to the second operation position, and the control unit performs the first control in response to operation that the operation unit receives through the angle adjustment image.

19. A printing apparatus comprising:

a printing unit configured to print an image on a printing medium;

an operation unit configured to receive an operation and rotate about a rotation axis to a first operation position and a second operation position, the first operation position being a position at which the operation unit is inclined at a predetermined first angle relative to an installation surface where the printing apparatus is disposed, the second operation position being a position at which the operation unit is inclined at a second angle smaller than the first angle relative to the installation surface;

a paper discharge tray provided lower than the rotation axis in a height direction, the height direction being a direction perpendicular to the installation surface and directed from the installation surface toward the printing apparatus, the paper discharge tray being configured to move in a front-rear direction toward a first direction intersecting the height direction;

a movement unit configured to move the paper discharge tray;

a rotating mechanism configured to cause the operation unit to rotate from the first operation position to the second operation position in association with movement of the paper discharge tray; and a control unit configured to control the printing unit, the operation unit, and the movement unit, wherein the paper discharge tray is configured to move to an accommodating position and a loading position, the accommodating position being a position at which the paper discharge tray is accommodated in a housing of the printing apparatus, the loading position being a position at which the paper discharge tray receives the discharged printing medium, when a position of the operation unit is the first operation position and the paper discharge tray moves between the accommodating position and the loading position, the rotating mechanism causes the operation unit to rotate from the first operation position to the second operation position, and when a position of the paper discharge tray is the accommodating position and a predetermined first condition is satisfied, the control unit controls the movement unit to perform third control in which the paper discharge tray is moved to the loading position and then, the paper discharge tray is moved to the accommodating position.

20. A method of controlling a printing apparatus, the printing apparatus including:

a printing unit configured to print an image on a printing medium;

an operation unit configured to receive an operation and rotate about a rotation axis to a first operation position and a second operation position, the first operation position being a position at which the operation unit is inclined at a predetermined first angle relative to an installation surface where the printing apparatus is disposed, the second operation position being a position at which the operation unit is inclined at a second angle smaller than the first angle relative to the installation surface;

a paper discharge tray provided lower than the rotation axis in a height direction, the height direction being a direction perpendicular to the installation surface and directed from the installation surface toward the printing apparatus, the paper discharge tray being configured to move in a front-rear direction toward a first direction intersecting the height direction;

a movement unit configured to move the paper discharge tray; and a rotating mechanism configured to cause the operation unit to rotate from the first operation position to the second operation position in association with movement of the paper discharge tray, wherein the paper discharge tray is configured to move to an accommodating position, a loading position, and a predetermined stand-by position, the accommodating position being a position at which the paper discharge tray is accommodated in a housing of the printing apparatus, the loading position being a position at which the paper discharge tray receives the discharged printing medium, the predetermined stand-by position being a position disposed closer to the accommodating position than the loading position, when a position of the operation unit is the first operation position and the paper discharge tray moves between the accommodating position and the stand-by position, the rotating mechanism causes the operation unit to rotate from the first operation position to the second operation position, and when a position of the paper discharge tray is the accommodating position and a predetermined first condition is satisfied, the method of controlling includes controlling the movement unit to perform a first control step in which the paper discharge tray is moved to the stand-by position.

* * * * *